US011509667B2

(12) United States Patent
Hines et al.

(10) Patent No.: US 11,509,667 B2
(45) Date of Patent: Nov. 22, 2022

(54) PREDICTIVE INTERNET RESOURCE REPUTATION ASSESSMENT

(71) Applicant: Microsoft Technology Licensing, LLC, Redmond, WA (US)

(72) Inventors: Douglas J. Hines, Kenmore, WA (US); Amar D. Patel, Issaquah, WA (US); Ravi Chandru Shahani, Bellevue, WA (US); Juilee Rege, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 481 days.

(21) Appl. No.: 16/658,037

(22) Filed: Oct. 19, 2019

(65) Prior Publication Data

US 2021/0120013 A1    Apr. 22, 2021

(51) Int. Cl.
*H04L 9/40*    (2022.01)
*G06N 3/04*    (2006.01)
*G06N 3/08*    (2006.01)

(52) U.S. Cl.
CPC ........... *H04L 63/1416* (2013.01); *G06N 3/04* (2013.01); *G06N 3/08* (2013.01)

(58) Field of Classification Search
CPC .................................. G06N 3/04; G06N 3/08
(Continued)

(56) References Cited

U.S. PATENT DOCUMENTS 8,468,597 B1 * 6/2013 Warner ................. H04L 51/212
709/225

8,555,391 B1 * 10/2013 Demir ..................... G06F 21/56
713/188

(Continued)

FOREIGN PATENT DOCUMENTS

WO    2014035988 A1    3/2014

OTHER PUBLICATIONS

Hirotomo, et al., "Efficient Method for Analyzing Malicious Websites by Using Multi-Environment Analysis System", In Proceedings of 12th Asia Joint Conference on Information Security, Aug. 10, 2017, pp. 48-54.

(Continued)

*Primary Examiner* — Kambiz Zand
*Assistant Examiner* — Mahabub S Ahmed
(74) *Attorney, Agent, or Firm* — Ogilvie Law Firm

(57) ABSTRACT

IPRID reputation assessment enhances cybersecurity. IPRIDs include IP addresses, domain names, and other network resource identities. A convolutional neural network or other machine learning model is trained with data including aggregate features or rollup features or both. Aggregate features may include aggregated submission counts, classification counts, HTTP code counts, detonation statistics, and redirect counts, for instance. Rollup features reflect hierarchical rollups of data using <unknown> value placeholders specified in IPRID templates. The trained model can predictively infer a label, or produce a rapid lookup table of IPRIDs and maliciousness probabilities. Training data may be organized in grids with rows, columns, planes, branches, and slots. Training data may include whois data, geolocation data, and tenant data. Training data tuple sets may be expanded by date or by original IPRID. Trained models can predict domain labels accurately at scale, even when most of the domains encountered have never been classified before.

20 Claims, 8 Drawing Sheets

(58) Field of Classification Search
USPC .................................................. 726/22–25
See application file for complete search history.

(56) References Cited

U.S. PATENT DOCUMENTS

| | | | |
|---|---|---|---|
| 8,631,489 B2 * | 1/2014 | Antonakakis | H04L 63/1408 726/22 |
| 9,930,065 B2 * | 3/2018 | Nelms | H04L 63/1425 |
| 10,255,445 B1 * | 4/2019 | Brinskelle | G06F 21/606 |
| 10,404,747 B1 | 9/2019 | Sela et al. | |
| 10,454,967 B1 * | 10/2019 | Zaslavsky | H04L 63/1441 |
| 10,972,495 B2 * | 4/2021 | Berlin | H04L 63/1416 |
| 11,005,839 B1 | 5/2021 | Shahidzadeh et al. | |
| 11,070,646 B1 * | 7/2021 | Lingafelt | H04L 67/51 |
| 2002/0099952 A1 | 7/2002 | Lambert et al. | |
| 2002/0143813 A1 | 10/2002 | Jellum et al. | |
| 2003/0182549 A1 | 9/2003 | Hallin et al. | |
| 2003/0204425 A1 | 10/2003 | Kennedy et al. | |
| 2004/0139192 A1 * | 7/2004 | Spaid | G06F 16/958 709/224 |
| 2004/0148170 A1 | 7/2004 | Acero et al. | |
| 2004/0162985 A1 | 8/2004 | Freeman et al. | |
| 2004/0164987 A1 | 8/2004 | Aronson et al. | |
| 2005/0021971 A1 | 1/2005 | Patankar et al. | |
| 2005/0122334 A1 | 6/2005 | Boyd et al. | |
| 2005/0210061 A1 | 9/2005 | Chang et al. | |
| 2005/0243094 A1 | 11/2005 | Patel et al. | |
| 2005/0251382 A1 | 11/2005 | Chang et al. | |
| 2005/0273335 A1 | 12/2005 | Chang et al. | |
| 2005/0273336 A1 | 12/2005 | Chang et al. | |
| 2005/0273771 A1 | 12/2005 | Chang et al. | |
| 2005/0289522 A1 | 12/2005 | Chang et al. | |
| 2007/0079358 A1 | 4/2007 | Lambert et al. | |
| 2007/0079372 A1 | 4/2007 | Lambert et al. | |
| 2007/0083912 A1 | 4/2007 | Lambert et al. | |
| 2007/0192855 A1 * | 8/2007 | Hulten | H04L 63/1483 707/E17.115 |
| 2008/0198169 A1 | 8/2008 | Boyd et al. | |
| 2009/0182550 A1 | 7/2009 | Alonichau et al. | |
| 2009/0187988 A1 * | 7/2009 | Hulten | H04L 63/102 726/22 |
| 2009/0281972 A1 | 11/2009 | Shahani et al. | |
| 2009/0320136 A1 | 12/2009 | Lambert et al. | |
| 2010/0153930 A1 | 6/2010 | Lambert et al. | |
| 2010/0185631 A1 | 7/2010 | Caldwell et al. | |
| 2010/0186088 A1 * | 7/2010 | Banerjee | G06F 21/51 709/224 |
| 2010/0306847 A1 | 12/2010 | Lambert et al. | |
| 2010/0325359 A1 | 12/2010 | Goel et al. | |
| 2010/0332601 A1 | 12/2010 | Walter et al. | |
| 2011/0154505 A1 | 6/2011 | Cowan et al. | |
| 2011/0191342 A1 | 8/2011 | Cohen et al. | |
| 2011/0191848 A1 | 8/2011 | Zorn et al. | |
| 2011/0234592 A1 | 9/2011 | Patel et al. | |
| 2011/0252476 A1 | 10/2011 | Loveland et al. | |
| 2011/0296524 A1 | 12/2011 | Hines et al. | |
| 2011/0302455 A1 | 12/2011 | Thomas et al. | |
| 2011/0314544 A1 | 12/2011 | Shin et al. | |
| 2012/0086715 A1 | 4/2012 | Patel et al. | |
| 2012/0271805 A1 | 10/2012 | Holenstein et al. | |
| 2012/0324568 A1 * | 12/2012 | Wyatt | H04W 12/128 726/13 |
| 2013/0111587 A1 | 5/2013 | Goel et al. | |
| 2014/0033307 A1 * | 1/2014 | Schmidtler | H04L 63/1483 726/22 |
| 2014/0035988 A1 | 2/2014 | Naruse | |
| 2014/0122061 A1 | 5/2014 | Van Caldwell et al. | |
| 2014/0172813 A1 | 6/2014 | Yan et al. | |
| 2014/0237607 A1 | 8/2014 | Lambert et al. | |
| 2014/0359760 A1 * | 12/2014 | Gupta | H04L 63/1483 726/22 |
| 2014/0365443 A1 | 12/2014 | Goel et al. | |
| 2014/0368523 A1 | 12/2014 | Patel et al. | |
| 2015/0006159 A1 | 1/2015 | Cai et al. | |
| 2015/0091931 A1 | 4/2015 | Pelton et al. | |
| 2015/0143525 A1 | 5/2015 | Naldurg et al. | |
| 2015/0172311 A1 | 6/2015 | Freedman et al. | |
| 2015/0326521 A1 | 11/2015 | Osipkov et al. | |
| 2016/0014081 A1 * | 1/2016 | Don, Jr. | H04L 63/0236 726/11 |
| 2016/0055555 A1 * | 2/2016 | Mills | G06Q 30/0609 705/26.35 |
| 2016/0071230 A1 | 3/2016 | Patel et al. | |
| 2016/0071315 A1 | 3/2016 | Cohen et al. | |
| 2016/0173434 A1 | 6/2016 | Midgen et al. | |
| 2016/0191548 A1 | 6/2016 | Smith et al. | |
| 2017/0061662 A1 | 3/2017 | Pelton et al. | |
| 2017/0109259 A1 | 4/2017 | Lewis et al. | |
| 2017/0109379 A1 | 4/2017 | Crawford et al. | |
| 2017/0109380 A1 | 4/2017 | Crawford et al. | |
| 2017/0109927 A1 | 4/2017 | Patel et al. | |
| 2017/0185895 A1 * | 6/2017 | Chen | G06N 3/0454 |
| 2017/0187782 A1 | 6/2017 | Crawford et al. | |
| 2017/0373943 A1 | 12/2017 | Goel et al. | |
| 2018/0063168 A1 * | 3/2018 | Sofka | G06N 3/0454 |
| 2018/0089164 A1 * | 3/2018 | Iida | G06K 9/6223 |
| 2018/0095805 A1 | 4/2018 | Patel et al. | |
| 2018/0191778 A1 * | 7/2018 | Volkov | H04L 63/1483 |
| 2018/0205691 A1 | 7/2018 | Osipkov et al. | |
| 2018/0213000 A1 | 7/2018 | Patel et al. | |
| 2018/0248904 A1 | 8/2018 | Villella et al. | |
| 2018/0351972 A1 * | 12/2018 | Yu | H04L 63/1416 |
| 2018/0367548 A1 | 12/2018 | Stokes et al. | |
| 2019/0014149 A1 * | 1/2019 | Cleveland | H04L 9/3236 |
| 2019/0019058 A1 * | 1/2019 | Woodbridge | G06F 21/554 |
| 2019/0028557 A1 | 1/2019 | Modi et al. | |
| 2019/0122258 A1 * | 4/2019 | Bramberger | G06Q 30/0248 |
| 2019/0236095 A1 * | 8/2019 | Achan | G06F 16/9535 |
| 2019/0259084 A1 * | 8/2019 | Guo | G06V 30/194 |
| 2019/0272664 A1 | 9/2019 | Kinross et al. | |
| 2020/0027190 A1 | 1/2020 | Kinross et al. | |
| 2020/0076837 A1 | 3/2020 | Ladnai et al. | |
| 2020/0112571 A1 * | 4/2020 | Koral | G06N 3/08 |
| 2020/0112574 A1 * | 4/2020 | Koral | G06N 3/04 |
| 2020/0167643 A1 * | 5/2020 | Bivens | G06N 3/0427 |
| 2020/0195669 A1 * | 6/2020 | Karasaridis | G06N 3/088 |
| 2020/0311766 A1 | 10/2020 | Shiravi Khozani et al. | |
| 2020/0349430 A1 * | 11/2020 | Schmidtler | G06N 3/0445 |
| 2020/0358799 A1 * | 11/2020 | Boyer | H04L 51/224 |
| 2020/0358819 A1 * | 11/2020 | Bowditch | G06K 9/6267 |
| 2020/0401696 A1 * | 12/2020 | Ringlein | G06N 3/08 |
| 2021/0019304 A1 * | 1/2021 | Nah | G06F 16/2365 |
| 2021/0021612 A1 * | 1/2021 | Higbee | H04L 63/1491 |
| 2021/0049441 A1 * | 2/2021 | Bronstein | G06N 3/0445 |
| 2021/0065872 A1 * | 3/2021 | Whalen | G16H 40/67 |
| 2021/0281606 A1 * | 9/2021 | Singh | G06N 5/04 |
| 2021/0306375 A1 | 9/2021 | Patel et al. | |

OTHER PUBLICATIONS

Nazario, Jose, "PhoneyC: A Virtual Client Honeypot", In Proceedings of the 2nd USENIX Conference on Large-Scale Exploits and Emergent Threats: Botnets, Spyware, Worms, and More, Apr. 1, 2009, 8 Pages.

"Invitation To Pay Additional Fees issued in PCT Application No. PCT/US21/016270", Mailed Date: Apr. 30, 2021, 14 Pages.

"International Search Report and Written Opinion Issued in PCT Application No. PCT/US21/016270", dated Jun. 21, 2021, 19 Pages.

Bhattaharjee, et al., "Prioritized Active Learning for Malicious URL Detection using Weighted Text-Based Features", In Proceedings of IEEE International Conference on Intelligence and Security Informatics (ISI), Jul. 22, 2017, pp. 107-112.

Lison, et al., "Neural Reputation Models Learned from Passive DNS Data", In Proceedings of IEEE International Conference on Big Data (Big Data), Dec. 11, 2017, pp. 3662-3671.

"International Search Report and Written Opinion Issued in PCT Application No. PCT/US20/054658", dated Dec. 16, 2020, 14 Pages.

Woodbridge, et al., "Predicting Domain Generation Algorithms with Long Short-Term Memory Networks", retrieved from <<https://

(56) References Cited

OTHER PUBLICATIONS www.covert.io/research-papers/deep-learning-security/Predicting%20Domain%20Generation%20Algorithms%20with%20Long%20Short-Term%20Memory%20Networks.pdf>>, Nov. 2, 2016, 13 pages.

Doyen Sahoo, et al., "Malicious URL Detection using Machine Learning: A Survey", retrieved from <<https://arxiv.org/pdf/1701.07179.pdf>>, Aug. 2019, 37 pages.

Hyrum Anderson, et al., "Using Deep Learning To Detect DGAs", retrieved from <<https://www.endgame.com/blog/technical-blog/using-deep-learning-detect-dgas>>, Nov. 18, 2016, 13 pages.

Ebubekir Büber, "Phishing URL Detection with ML", retrieved from <<https://towardsdatascience.com/phishing-domain-detection-with-ml-5be9c99293e5>>, Feb 8, 2018, 14 pages.

"Keras", retrieved from <<https://en.wikipedia.org/wiki/Keras>>, Sep. 13, 2019, 3 pages.

"Databricks", retrieved from <<https://en.wikipedia.org/wiki/Databricks>>, Sep. 20, 2019, 2 pages.

"Microsoft Cognitive Toolkit", retrieved from <<https://en.wikipedia.org/wiki/Microsoft_Cognitive_Toolkit>>, Sep. 12, 2019, 1 page.

"Memory-Mapped Files", retrieved from <<https://docs.microsoft.com/en-us/dotnet/standard/io/memory-mapped-files>>, Mar. 29, 2017, 12 pages.

Patrick Nohe, "Nearly 21% of the world's top 100,000 websites still aren't using HTTPS", retrieved from <<https://www.thesslstore.com/blog/nearly-21-of-the-worlds-top-100000-websites-still-arent-using-https/>>, Dec. 12, 2018, 8 pages.

"TrustedSource", retrieved from <<https://en.wikipedia.org/wiki/TrustedSource>>, Aug. 6, 2019, 2 pages.

"Adaptive Clientless Rendering", Retrieved From: https://www.menlosecurity.com/adaptive-clientless-rendering, Retrieved Date: Mar. 4, 2020, 5 Pages.

"ANY.RUN—Interactive Online Malware Sandbox", Retrieved From: https://web.archive.org/web/20191231113835/https://any.run/, Dec. 31, 2019, 6 Pages.

Halfin, et al., "Enable SIEM Integration in Microsoft Defender ATP", Retrieved From: https://docs.microsoft.com/en-us/windows/security/threat-protection/microsoft-defender-atp/enable-siem-integration, Dec. 10, 2019, 4 Pages.

"Cyren Sandboxing", Retrieved From: https://www.cyren.com/tl_files/downloads/resources/Cyren_Datasheet_SaaSSandboxing_20180308_ltr_EN_web.pdf, Mar. 8, 2018, 2 Pages.

Symantec Full Web Isolation—Initial Cloud Service Subscription (1 year) +, Retrieved From: https://www.cdw.com/product/Symantec-Full-Web-Isolation-Initial-Cloud-Service-Subscription-1-year/4877965, Retrieved Date: Mar. 4, 2020, 3 Pages.

"Evolving Office 365 Advanced Threat Protection with URL Detonation and Dynamic Delivery", Retrieved From: https://www.microsoft.com/en-us/microsoft-365/blog/2017/01/25/evolving-office-365-advanced-threat-protection-with-url-detonation-and-dynamic-delivery/, Jan. 25, 2017, 10 Pages.

"Free Online Sandbox FAQ", Retrieved From: https://www.splunk.com/en_us/products/premium-solutions/splunk-enterprise-security/online-sandbox-faq.html. Retrieved Date: Feb. 24, 2020, 3 Pages.

"Gather Any Web Data, from Any Website", Retrieved From: https://luminati.io/. Retrieved Date: Mar. 28, 2020, 9 Pages.

"Understanding IP Address Geolocation", Retrieved From: https://support.authentic8.com/support/solutions/articles/16000027683-understanding-ip-address-geolocation, Apr. 18, 2019, 5 Pages.

"Honeypot (computing)", Retrieved From: https://en.wikipedia.org/wiki/Honeypot_(computing), Feb. 26, 2020, 6 Pages.

"User Guide: TrustedProxies GeoSet Toolbar", Retrieved From: https://customers.trustedproxies.com/index.php?rp=/knowledgebase/42/User-Guide-TrustedProxies-GeoSet-Toolbar.html, Retrieved Date: Mar. 6, 2020, 9 Pages.

"Web Isolation", Retrieved From: https://www.broadcom.com/products/cyber-security/web-and-email/gateway/web-isolation, Retrieved Date: Mar. 4, 2020, 4 Pages.

"Proofpoint—PP-M-PWD-S-A-105—Pfpt Personal Webmail Def-s 1001 To 2000 12", Retrieved From: https://www.neobits.com/proofpoint_pp_m_pwd_s_a_105_pfpl_personal_webmail_p12232805.html, Retrieved Date: Mar. 4, 2020, 3 Pages.

"Proofpoint Browser Isolation", Retrieved From: https://www.proofpoint.com/sites/default/files/pfpt-us-ds-browser-isolation.pdf, Nov. 2019, 2 Pages.

"Proofpoint Security and Compliance Price List", Retrieved From: https://www.cybersecuritypricing.org/proofpoint-security-and-compliance-price-list/. Retrieved Date: Mar. 4, 2020, 1 Page. (excerpt).

"Proxify Services", Retrieved From: https://proxify.com/services.shtml, Retrieved Date: Mar. 6, 2020, 1 Page.

Remington, Darren, "Cloudflare +Remote Browser Isolation", Retrieved From: https://blog.cloudflare.com/cloudflare-and-remote-browser-isolation/, Jan. 7, 2020, 16 Pages.

Bule, Guise, "Remote Browser Isolation—A Guide To The Vendors In The Market", Retrieved From: https://www.secjuice.com/remote-browser-isolation-vendors/, Jun. 28, 2018, 11 Pages.

"Request for Information (RFI) for Cloud Based Internet Isolation Solution", Request From: https://insidecybersecurity.com/sites/insidecybersecurity.com/files/documents/2018/aug/cs2018_0376.pdf, Aug. 2018, 4 Pages.

"Security Information and Event Management", Retrieved From: https://en.wikipedia.org/wiki/Security_information_and_event_management, Feb. 12, 2020, 4 Pages.

Roccia, et al., "Evolution of Malware Sandbox Evasion Tactics—A Retrospective Study", Retrieved From: https://www.mcafee.com/blogs/other-blogs/mcafee-labs/evolution-of-malware-sandbox-evasion-tactics-a-retrospective-study/, Sep. 9, 2019, 19 Pages.

Waterman, Shaun, "Isolating Browsers from the Web's 'Cesspool': Why Symantec Bought FireGlass", Retrieved From: https://www.cyberscoop.com/symantec-fireglass-browser-isolation/, Jul. 10, 2017, 10 Pages.

Skulkin, et al., "An Overview of Web Browser Forensics", Retrieved From: https://www.digitalforensics.com/blog/an-overview-of-web-browser-forensics/. Retrieved Date: Mar. 4, 2020, 14 Pages.

Viegas, Rohan, "How Malware Sandboxes and SIEMs Work in Tandem to Effectively Detect Malware", Retrieved From: https://cybersecurity.att.com/blogs/security-essentials/how-malware-sandboxes-and-siems-work-in-tandem-to-effectively-detect-malware, Dec. 27, 2018, 3 Pages.

"Notice of Allowance Issued in U.S. Appl. No. 16/835,382", dated May 2, 2022, 11 Pages.

Ahmed, et al., "An Automated User Transparent Approach to log Web URLs for Forensic Analysis", In Proceedings of the Fifth International Conference on IT Security Incident Management and IT Forensics, Sep. 15, 2009, pp. 120-127.

Ieong, et al., "Deriving Cse-specific Live Forensics Investigation Procedures from FORZA", In Proceedings of the ACM Symposium on Applied Computing, Mar. 11, 2007, pp. 175-180.

Kelly, et al., "FIRST: Forensic Internet Replay Sequencing Tool", In Proceedings of the Eighth IEEE International Symposium on Network Computing and Applications, Jul. 9, 2009, pp. 270-273.

\* cited by examiner

SOME AGGREGATE FEATURES 308

| | |
|---|---|
| HTTP CODE 0 RESPONSE 702 COUNT 704 | COUNT 736 OF DISTINCT SUBMISSIONS 734 |
| | COUNT 740 OF DISTINCT FINAL HOSTNAMES 738 |
| HTTP CODE 200 RESPONSE 706 COUNT 708 | COUNT 744 OF PARTICULAR IPRID SUBMISSIONS 742 |
| | COUNT 748 OF PARTICULAR IPRID SUBMISSIONS 742 FROM WITHIN DOCUMENT 746 AS OPPOSED TO URL 614 |
| HTTP CODE 301 RESPONSE 710 COUNT 712 | COUNT 752 OF REDIRECTS TO PARTICULAR IPRID 750 |
| | COUNT 758 OF PARTICULAR IPRID CLASSIFICATIONS 756 AS NON-MALICIOUS 754 |
| HTTP CODE 400 RESPONSE 714 COUNT 716 | COUNT 764 OF PARTICULAR IPRID CLASSIFICATIONS 762 AS MALICIOUS PHISHING 760 |
| HTTP CODE 401 RESPONSE 718 COUNT 720 | COUNT 770 OF PARTICULAR IPRID CLASSIFICATIONS 768 AS MALICIOUS NON-PHISHING 766 |
| HTTP CODE 403 RESPONSE 722 COUNT 724 | COUNT 776 OF TIMES PARTICULAR IPRID WAS UNREACHABLE DUE TO ENDPOINT 774 ERROR 772 |
| HTTP CODE 404 RESPONSE 726 COUNT 728 | COUNT 780 OF NETWORK ERRORS 778 ENCOUNTERED WHILE TRYING TO REACH PARTICULAR IPRID |
| | OTHER HTTP CODE RESPONSE 730 COUNT 732 |

NUMBER 786 OF SUBMISSIONS 782 OF ONE OR MORE KINDS 784

SUCCESSFUL / FAILED DETONATION 788 STATISTIC 790 / 792

MALICIOUS / NON-MALICIOUS VERDICT 794 STATISTIC 796 / 798

Fig. 7

PREDICTIVE INTERNET RESOURCE REPUTATION ASSESSMENT

BACKGROUND

People, educational institutions, businesses, politicians, celebrities, and other entities have reputations which are used by decision makers, particularly when decisions involving privacy, safety, money, or one's own reputation are being made, or being reconsidered. Sometimes an entity's reputation is widely agreed on, while in other cases an entity's reputation varies greatly depending on who is asked. Some entity reputations remain largely the same over time, while others change frequently.

In computing environments, and particularly in environments involving the Internet, online identities also have reputations. A particular website, IP address, domain name, uniform resource locator (URL), email address, or other Internet identification may have a reputation, for example, as a source of malware or unwanted email, or conversely be viewed as a location that is safe to browse or safe to otherwise use online. Both commercial vendors and non-commercial sources provide reputation scores for such Internet identities. The reputation scores are then used by cybersecurity analysts and by automated cybersecurity tools to help reduce the risk of online activities.

SUMMARY

Some embodiments described in this document provide improved reputation assessment in computing systems. In particular, some embodiments employ innovations in the training of machine learning models, which allow useful maliciousness probabilities to be inferred even when the available data about an internet identity has gaps due to values being unknown. Some embodiments provide predictive models, which efficiently leverage past data to accurately predict current maliciousness probabilities. Implementations of these and other embodiments are also able to operate at scale in computing environments that involve hundreds of thousands of domain names or other Internet identities.

For convenience, "IPRID" is used herein to refer generally to Internet and other network resource identities. "IPRID" stands for "Internet Protocol Resource IDentification" and is pronounced to rhyme with "ship squid". Some examples of IPRIDs include website identifications, Internet Protocol (IP) addresses, domain names, uniform resource locators (URLs), email addresses, and other identifications of locations or actors that are potentially or actually online. Use of the Internet Protocol is frequent with many IPRIDS, but is not required, e.g., computing system resource identifications that are communicated over a network without using IP may nonetheless have reputations that are assessed using teachings provided herein, and thus these resource identifications may be IPRIDs.

Some IPRID reputation assessment embodiments described herein include or are in operable communication with a memory and a processor. The processor is in operable communication with the memory. The processor and the memory are configured in a trained convolutional neural network, which was trained using IPRID reputation training data that includes at least one of the following: aggregate features based on aggregated data about respective IPRIDs, or rollup features based on hierarchical rollups of data about IPRIDs which include placeholders designating unknown values. The IPRID reputation assessment embodiment is configured to enhance security of a guarded system. Security enhancement is accomplished, for example, when the trained convolutional neural network infers a label that distinguishes a malicious IPRID from other IPRIDs, or when the trained convolutional neural network produces a lookup table which distinguishes malicious IPRIDs from other IPRIDs.

Some embodiments obtain IPRID reputation training data which includes rollup features that are based on hierarchical rollups of data about IPRIDs which include placeholders designating unknown values. These embodiments train a machine learning model using the IPRID reputation training data, and utilize the trained machine learning model by producing a lookup table which distinguishes malicious IPRIDs from other IPRIDs. Lookup tables can be large and they also become less current and hence less accurate as time passes, but nonetheless lookup tables may be favored for production deployments because the tables provide reputation assessments much faster than their corresponding trained machine learning models.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some aspects of some aggregate features that may be used in training a machine learning model;

DETAILED DESCRIPTION

Overview

Figure 1:
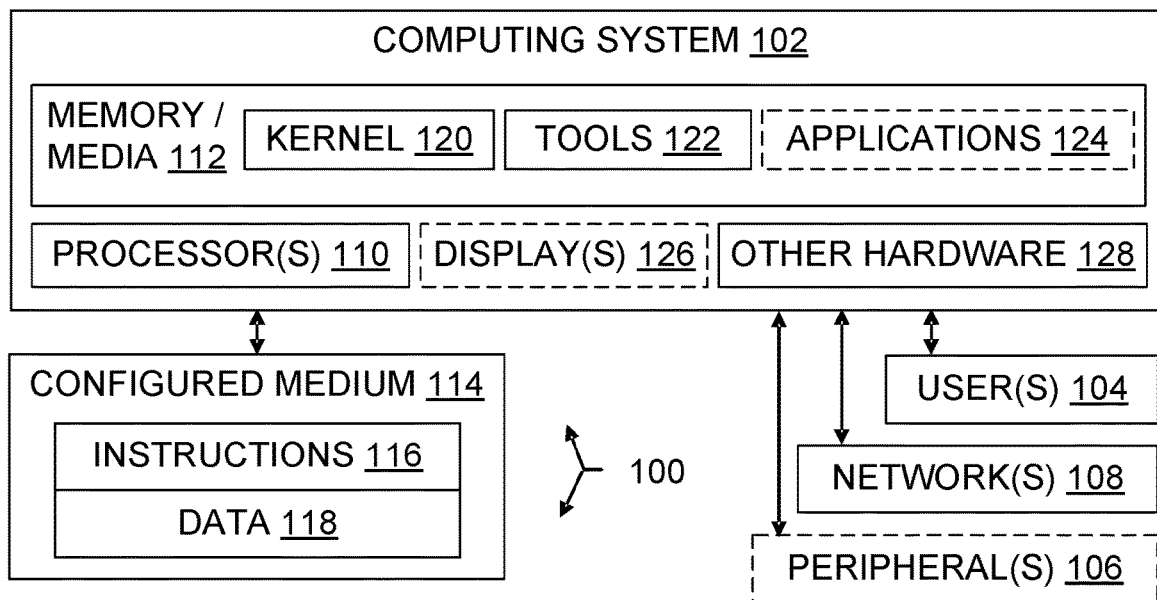
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the security of Microsoft cloud offerings. In particular, a technical challenge was to how to efficiently assign useful reputation scores to domains despite having little or no information about those domains.

Some malicious domain detection technologies "detonate" URLs by navigating to them in a protected manner, e.g., within a virtual machine that serves as a "sandbox" that is isolated from the rest of a computing system. During the detonation process, information is gathered about the URL and its domain, about any redirect chains, and about the landing page. That information can be transformed into features, which are then fed into heuristic or machine learning models to make a good or bad determination about the URL.

But detonating all domains encountered to check for malicious domains would take substantial computing resources, and may produce undesirable false negatives when the domain's site is down or unreachable for non-malicious reasons. A widely used cloud service provider such as Microsoft encounters hundreds of thousands of domains, or even millions of domains, in a given day, and even more URLs citing the domains. Most of these domains have not been scored in commercially available domain reputation lists, and many of the domains are being encountered for the first time by the service provider. So, as volume increases the service provider faces the challenge of optimizing, speed, cost and accuracy in assessing the reputations of such domains. A reputation system can improve speed and optimize computing resources required for making a good or bad determination for a given domain. An innovative domain reputation system can give useful results at scale for every domain encountered and do so faster than detonation of every domain would. Domain reputation assessment may also be more difficult to deceive than a detonation system.

Security is a primary concern for Microsoft and for many Microsoft customers. Various kinds of malicious domain detection technology help protect Azure® and Office 365® customers from attacks hosted on domains accessed through Azure® or attacks delivered as links through Office 365® services (marks of Microsoft Corporation). Some malicious domain detection technology is focused on stopping URL-based phishing and malware attacks directed at Microsoft itself or at Microsoft customers or partners. Some solutions described herein, and others, enable Microsoft to differentiate phishing sites based on parts of the fully qualified domain name or a full URL, and some support mechanisms that sort domains according to the likelihood they involve phishing.

Some embodiments described herein enable real-time domain lookup using a domain reputation system. Domain reputation may be considered loosely analogous to a credit score for the domain or subdomain.

In some embodiments, lookups against the domain reputation start with the full URL and progressively work down to the final Top Level Domain (TLD), substituting an "unknown" designation (indicated here by "<unknown>") for cases where at least one rollup occurred. In some embodiments, <unknown> is used for sub-domains that were previously unseen by the reputation assessment system. An embodiment may perform lookups all the way down to <unknown>.com, and even further to <unknown> by itself which means even the final TLD was unknown. When a rollup involving an <unknown> was performed, the maliciousness score reflects that involvement. So the result for <unknown>.bar.com may be a different score than for the raw bar.com domain. Using <unknown> rollup allows an embodiment to produce a score for any possible domain, even when the embodiment starts with a static list that only contains previously seen domains.

Some embodiments supplement or replace malicious domain detection technology which relies on human analysis, or relies on a URL detonation system that analyzes the URL inside of an isolated sandbox detonation virtual machine. A disadvantage of human analysis of domains for maliciousness is that human analysis is relatively very slow, labor intensive, and costly on a per URL basis. URL detonation doesn't require a human judgment and automates the analysis of a URL, but is still higher cost than a lookup-based analysis provided by some embodiments herein.

Some embodiments herein provide or use a lookup protocol against a static list (also called a "lookup table"), which will never return "I don't know" as a score for a domain. A relevant score can always be obtained. Some embodiments extend lookups beyond the TLD to the path or query parameters where rollups occur in situations where only the path or query parameters vary. Consider, for instance, www2.foo.bar.com/pathX/phishingpageX?<unknown> (same root and phishingpageX landing page with varying query parameters), or www2.foo.bar.com/<unknown>/phishingpageX (same root and phishingpageX landing page with varying path).

Some embodiments herein provide or use a convolutional neural network (CNN) trained on raw statistics and aggregates, which is able to build up its own features. Some training lays out the different aggregates into different planes of the input, which allows analysts to easily add new kinds of input and rebuild the model to reflect them.

Some embodiments avoid any reliance on training data combination features like #SiteUnavailable with #TotalDetonations; such data connections are created internally by the CNN.

In some embodiments, labeled training data is expanded by using the same label with aggregates from data several days ahead, along with a corresponding join which resolves cases when the domain is new.

In some embodiments, training data label aggregate joins allow CNN training which returns a correct score for rollup domains.

Other aspects of these embodiments and other reputation assessment embodiments are also described herein.

Some embodiments described herein may be viewed by some people in a broader context. For instance, concepts such as aggregation, classification, malice, probability, reputation, success, and training may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically detect malicious domains in a computing system. Other configured storage media, systems, and processes involving aggregation, classification, malice, probability, reputation, success, or training are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, machine learning models, programming languages, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as training a machine learning model, producing a lookup table of IPRIDs and maliciousness scores, aggregating data, rolling up data that includes unknown value designations, and joining tuples, which are each activities deeply rooted in computing technology. Some of the technical mechanisms discussed include, e.g., convolutional neural networks, training data grids, training data vector space planes, <unknown> designators in data, and domain redirection. Some of the technical effects discussed include, e.g., trained CNNs and other trained machine learning models, lookup tables of IPRIDs and maliciousness scores, individual inferred IPRID labels, IPRID labels produced despite the absence of data about portions of related IPRIDs, predictive IPRID labels, and expanded training data sets. Thus, purely mental processes are clearly excluded. Other advantages based on the technical characteristics of the teachings will also be apparent to one of skill from the description provided.

Note Regarding Hyperlinks

This disclosure may contain various URIs, URLs, hyperlinks, IP addresses, and/or other items which might be considered browser-executable codes. These items are included in the disclosure merely as a courtesy or format example, for instance, rather than being included to reference the contents of the web sites or files that they identify as necessary support for the description of embodiments. Applicant does not intend to have these URIs, URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CNN: convolutional neural network
CPU: central processing unit
DNN: deep neural network
DVD: digital versatile disk or digital video disc
FN: false negative
FP: false positive
FPGA: field-programmable gate array
FPU: floating point processing unit
GEO: geolocation
GPU: graphical processing unit
GUI: graphical user interface
HTTP: hypertext transfer protocol; unless otherwise stated, HTTP includes HTTPS herein
HTTPS: hypertext transfer protocol secure
IaaS or IAAS: infrastructure-as-a-service
ID: identification or identity
IoT: Internet of Things
IPRID: Internet and other network resource identities
LAN: local area network
ML: machine learning
OS: operating system
PaaS or PAAS: platform-as-a-service
RAM: random access memory
ROM: read only memory
SIEM: security information and event management; also refers to tools which provide security information and event management
TLD: Top Level Domain
TPU: tensor processing unit
UEFI: Unified Extensible Firmware Interface
URI: uniform resource identifier
URL: uniform resource locator
VM: virtual machine
WAN: wide area network
Whois: protocol or tool which provides domain name registration info; also refers to info obtained using a whois protocol or tool Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource.

Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. IPRID reputation assessment operations such as training a model using IPRID training data, inferring a label using a model trained by IPRID training data, and many other operations discussed herein, are understood to be inherently digital. A human mind cannot interface directly with a CPU or other processor, or with RAM or other digital storage, to read and write the necessary data to perform the IPRID reputation assessment steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as aggregating, analyzing, assigning, comparing, computing, creating, determining, displaying, distinguishing, employing, enhancing, executing, expanding, feeding, gathering, generating, indicating, inferring, joining, obtaining, operating, organizing, outputting, performing, predicting, providing, reading, receiving, rolling up, running, selecting, storing, training, using, utilizing, writing (and aggregates, aggregated, analyzes, analyzed, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, autocompletion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

200 client device

202 IPRID 204 cloud 206 server 208 service 210 guarded system

212 IPRID reputation assessment operations or system or both 300 aspect of IPRID reputation assessment training data 302 IPRID reputation; may be expressed in software as a label 326, e.g., as a numeric score or as a Boolean verdict (e.g., "safe", "unsafe"), or as a classification (e.g., PHISH, BAD-NONPHISH, PHISH-CONTOSO, PHISH-FOOBAR); classification may be tailored for a particular campaign, malware variation, or brand that is being spoofed; classification need not always be binary, e.g., an N-brand phish classifier may be used for labeling 304 IPRID reputation assessment training data 306 training data feature generally, as opposed to a specific feature or a specific kind (aggregate, rollup) of feature 308 aggregate feature 310 rollup feature 312 raw data, e.g., data not yet aggregated or rolled up 314 combination feature 316 freedom from combination features 318 date, e.g., date data was obtained or other date data pertains to 320 grid of IPRID reputation assessment training data; also referred to as "data grid" or "grid" or "grid data"

322 column in data grid 324 row in data grid 326 label, in the sense of "labeled training data" or "supervised training"; may be a numeric probability or a verdict; may apply to an individual IPRID or to a set of IPRIDs 328 data source 330 data meaning 332 data plane; also referred to as "vector space plane"; may be for example a vector space plane in an N-dimensional data grid 320, with N>2

334 data from or about a particular tenant, e.g., a particular cloud customer or particular cloud user 336 whois data 338 geolocation data 340 branch in input data; branch of input training data 342 classification count, e.g., count of number of times an IPRID was placed in a particular category or class by a classifier tool or operation 344 original domain, e.g., domain entered into browser by user 346 redirection domain, e.g., domain to which navigation was automatically redirected from an original domain; reference numeral 346 also refers to an act of redirection 348 domain generally; also referred to as "domain name"

400 an example system with IPRID reputation assessment functionality 402 machine learning model trained to perform IPRID reputation assessment operations, e.g., inference of IPRID label, or production of lookup table of IPRIDs with corresponding maliciousness scores or other labels 404 convolutional neural network; may be considered a kind of deep neural network 406 tuple; may also be referred to as an "example", "label tuple", "sample", or "labeled item"

408 lookup table; contains multiple IPRID maliciousness probabilities and corresponding IPRIDs or IPRID templates or both 410 corpus of IPRIDs, e.g., a collection or other data set containing IPRIDs 412 maliciousness probability value; may also be referred to as a "score"

414 network interface 502 decision tree classifier machine learning model 504 long short term memory machine learning model 506 logistical regression machine learning model 508 deep neural network machine learning model 602 rollup is hierarchical 604 placeholder designating one or more unknown values, e.g., "<unknown>" is a notation used herein, but placeholder 604 can also be indicated and implemented using other notations 606 one or more unknown values 608 IPRID template 610 path in a URL 612 query parameter in a URL 614 uniform resource locator (URL)

616 IP address; may be IPv4 or IPv6

618 octet in an IPv4 IP address, e.g., the IP address 192.168.0.1 has four octets, and the value of each octet is known 702 HTTP or HTTPS response code 0 or another generic error code (use of 0 as a response may be implementation-dependent)

704 count of occurrences of HTTP or HTTPS response code 0

706 HTTP or HTTPS response code 200

708 count of occurrences of HTTP or HTTPS response code 200

710 HTTP or HTTPS response code 301

712 count of occurrences of HTTP or HTTPS response code 301

714 HTTP or HTTPS response code 400

716 count of occurrences of HTTP or HTTPS response code 400

718 HTTP or HTTPS response code 401

720 count of occurrences of HTTP or HTTPS response code 401

722 HTTP or HTTPS response code 403

724 count of occurrences of HTTP or HTTPS response code 403

726 HTTP or HTTPS response code 404

728 count of occurrences of HTTP or HTTPS response code 404

730 HTTP or HTTPS response code other than the codes called out separately in a given embodiment 732 count of occurrences of HTTP or HTTPS response code other than the codes called out separately in a given embodiment 734 distinct submission of a URL or URL substring for malice analysis; reputation assessment is an example of malice analysis; "malice analysis" in a given implementation may include, e.g., subjective human analysis, detonation and related analysis, static analysis based on the presence of indicators such as typos or homoglyphs, analysis according to teachings presented herein, or a combination thereof 736 count of distinct submissions of URLs or URL substrings for malice analysis 738 distinct final hostname 740 count of distinct final hostnames 742 submission of a particular IPRID for malice analysis; submission may be, e.g., submission of a domain to a tool for detonation analysis of the domain; the number of submissions is implicitly or explicitly within a time period 744 count of submissions of a particular IPRID for malice analysis 746 document, e.g., an email, video, PDF file, spreadsheet, or word processing document 748 count of submissions of a particular IPRID for malice analysis as a result of that IPRID appearing in a document 746 as opposed to the IPRID appearing in a URL 614 as part of navigation using HTTP or HTTPS 750 redirection 346 to a particular IPRID 752 count of redirections to a particular IPRID 754 non-malicious IPRID 756 classification of an IPRID as non-malicious 758 count of times a particular IPRID has been classified as non-malicious 760 malicious phishing IPRID 762 classification of an IPRID as malicious phishing 764 count of times a particular IPRID has been classified as a malicious phishing IPRID 766 malicious non-phishing IPRID 768 classification of an IPRID as malicious non-phishing 770 count of times a particular IPRID has been classified as a malicious non-phishing IPRID 772 endpoint error 774 network endpoint, e.g., a location identified by an IPRID 776 count of times a particular IPRID was deemed unreachable in conjunction with an error 772 from an endpoint 774

778 network error 780 count of times network error was encountered while trying to reach a particular IPRID 782 submission of any IPRID for malice analysis 784 kind of submission for malice analysis, e.g., any submission of a particular IPRID versus submission of a particular IPRID as a result of that IPRID appearing in a document 786 number (i.e., count) of IPRID submissions regardless of kind 780

788 IPRID detonation 790 count or other statistic based on successful detonation of IPRID, that is, IPRID was reachable through detonation 792 count or other statistic based on failed detonation of IPRID, that is, IPRID was unreachable through detonation 794 IPRID classification verdict; a Boolean or other non-numeric value such as "malicious" or "safe" or "malicious phishing"

796 count or other statistic based on verdict classifying IPRID as malicious 798 count or other statistic based on verdict classifying IPRID as non-malicious 800 another example system with IPRID reputation assessment functionality 802 one or more layers in neural network; a CNN 404 has, e.g., 4-5 or 6-8 layers, or 12 layers, in various embodiments 804 sigmoid function in neural network 806 cybersecurity tools, e.g., firewalls, antimalware software, web vulnerability scanning tools, penetration testing tools, traffic monitoring software, virtual private network software, encryption and decryption software, identity authentication software, SIEMs, logging tools, intrusion detection tools, intrusion prevention tools, data loss prevention software, communication protection, email protection, sandbox detonation services, web application firewalls, cloud security software, remote wipe software, threat protection software (as in protection against threats, not protection of threats), data privacy tools, risk management tools, forensic tools, regulatory compliance tools, litigation evidence production tools, antivirus tools 902 cell in data grid 908 row span (span of one row), e.g., seven days when grid 320 is organized with week rows 910 column span (span of one column), e.g., ten weeks when grid 320 is organized with weekday columns 1102 group of vector space planes in N-dimensional data grid, N>2

1200 another example system with IPRID reputation assessment functionality 1204 non-aggregate training data 1206 aggregate data input processor 1208 whois data input processor 1210 non-aggregate data input processor 1212 IPRID reputation assessment functionality output, e.g., IPRID label 326 or lookup table 408

Figure 13:
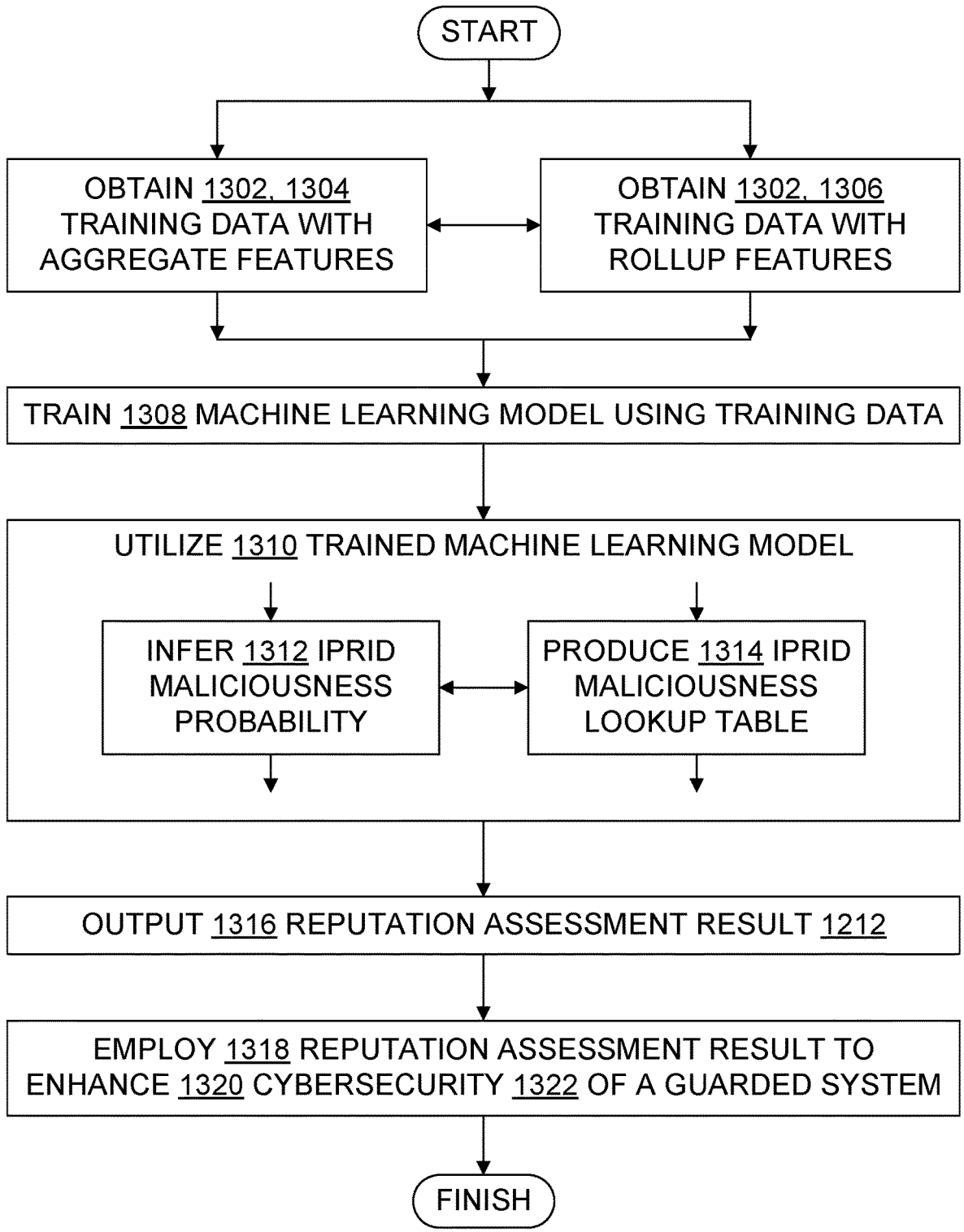
FIG. 13 is a flowchart illustrating steps in some IPRID reputation assessment methods.
Figure 14:
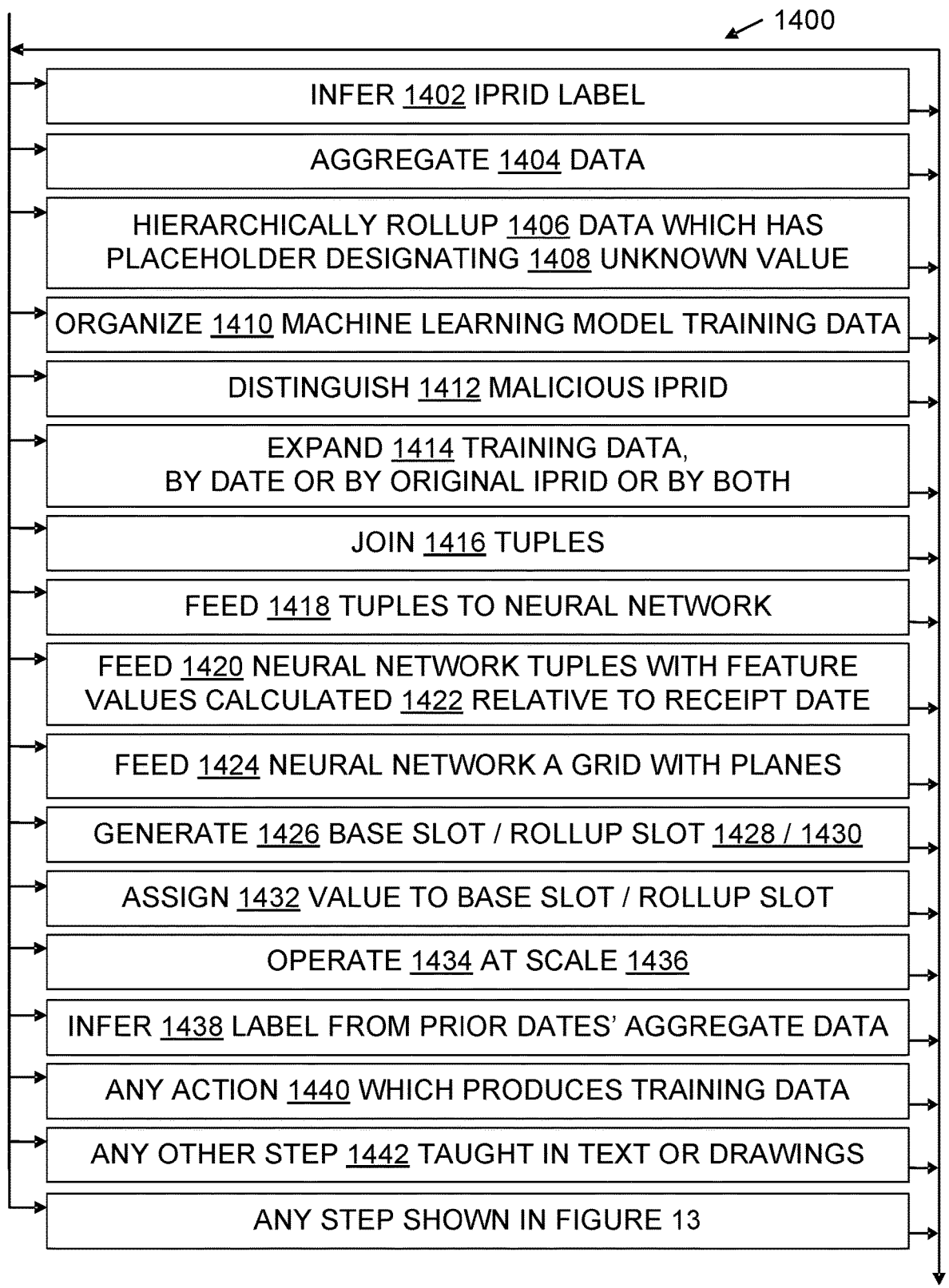
FIG. 14 is a flowchart further illustrating steps in some IPRID reputation assessment methods.

1300 flowchart; 1300 also refers to reputation assessment methods illustrated by or consistent with the FIG. 13 flowchart 1302 obtain training data 1304 obtain training data which includes aggregate features 1306 obtain training data which includes rollup features 1308 train a machine learning model; presumed to be supervised learning which uses labeled data; a "trained" model is one which has been fed at least one piece of training data, not one that has been fully trained in some sense 1310 utilize a trained machine learning model 1312 utilize a trained machine learning model by inferring an IPRID maliciousness probability 1314 utilize a trained machine learning model by producing an IPRID maliciousness probability lookup table 1316 output a reputation assessment result, e.g., by screen display, paper printout, or digital data output 1318 employ a reputation assessment result to enhance cybersecurity 1320 enhance cybersecurity, e.g., by reducing a risk of unprotected use of a malicious IPRID 1322 cybersecurity of a particular system 102, e.g., the extent to which confidentiality, integrity, availability, or privacy of data or computational resources of a given system is at risk 1400 flowchart; 1400 also refers to reputation assessment methods illustrated by or consistent with the FIG. 14 flowchart (which incorporates the steps of FIG. 13)

1402 infer an IPRID label 326

1404 aggregate data 1406 roll up data in a hierarchical manner 1408 designate an unknown value 1410 organize training data for input to a machine learning system 1412 distinguish one or more malicious IPRIDs from other IPRIDs that are either non-malicious or not malicious in the same way (e.g., malicious phishing IPRID versus malicious malware delivery IPRID)

1414 expand a set of training data to contain additional examples 1416 join two or more tuples 1418 feed tuples to a neural network or other model to help train the model 1420 feed tuples to a neural network specifically 1422 calculate feature values relative to a particular date 318

1424 feed planes 332 of data to a neural network 1426 generate a base slot or a rollup slot or both 1428 base slot 1430 rollup slot 1432 assign a value to a slot 1434 operate at scale according to a particular definition of "at scale"

1436 a definition of "at scale"

1438 infer a label from aggregate data of prior dates; a special case of inference 1402

1440 any action which produces training data, e.g., counting submissions, collecting detonation statistics, collecting HTTP error statistics, collecting classification statistics, collecting verdict statistics, collecting geolocation data, collecting whois data, collecting tenant data, aggregating data, rolling up data, or expanding training data 1442 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, IPRID reputation assessment functionality could be installed on an air gapped system and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
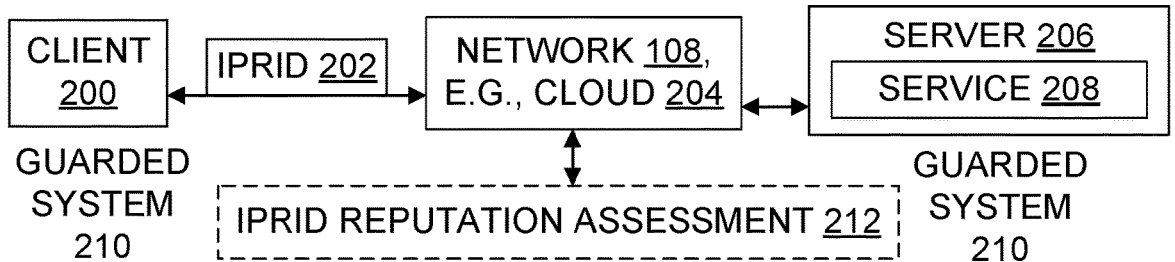
FIG. 2 is a block diagram illustrating a computing system environment which includes network communications that contain IPRIDs (Internet and other network resource identifications)
Figure 3:
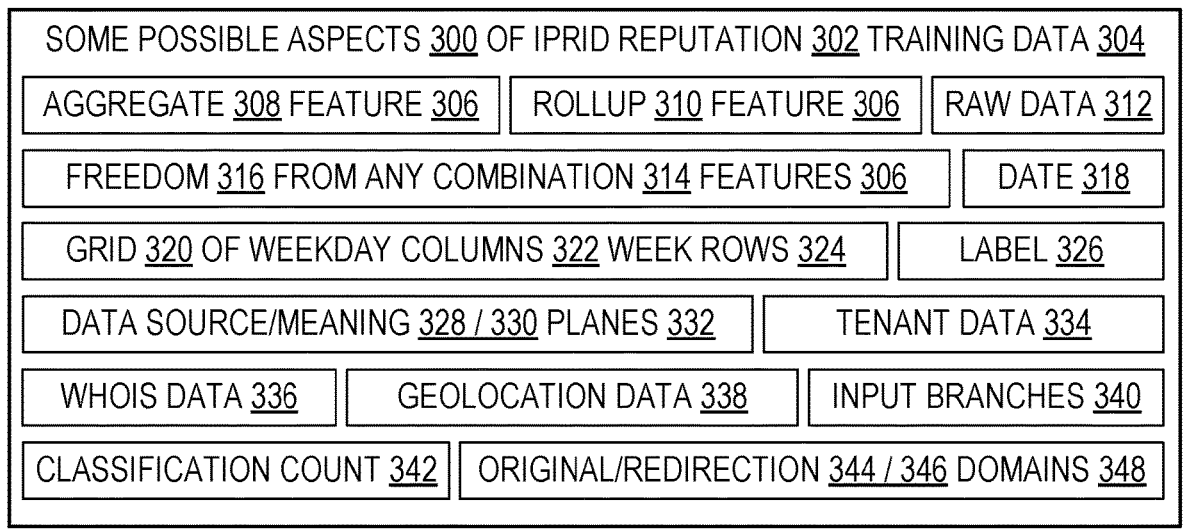
FIG. 3 is a block diagram illustrating some aspects of IPRID reputation assessment training data.
Figure 4:
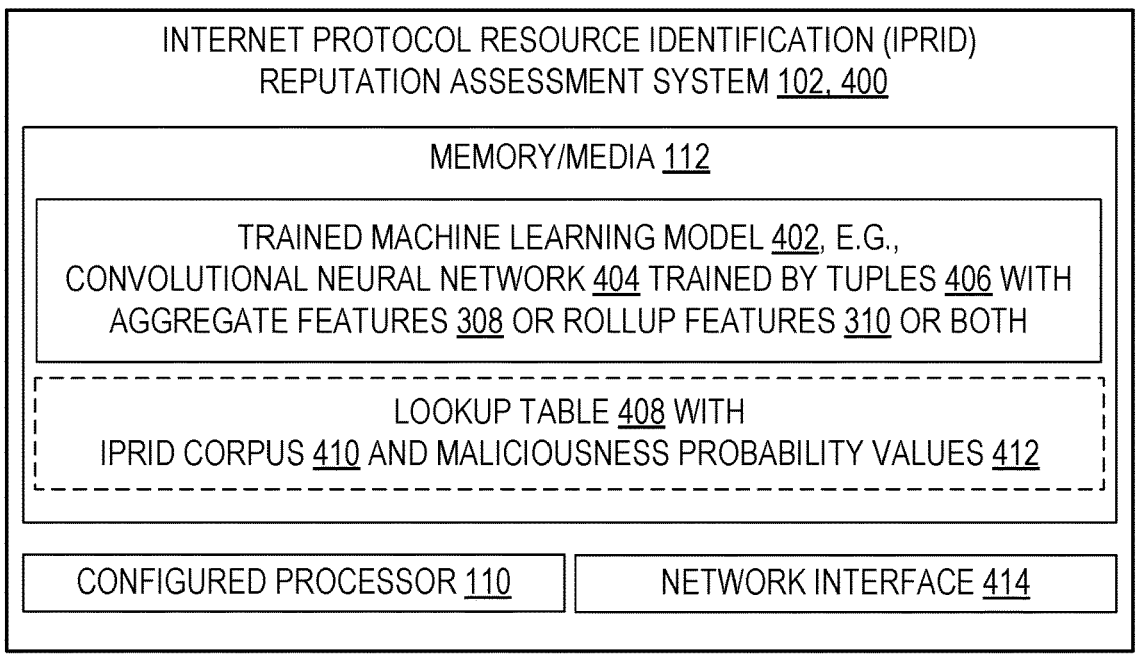
FIG. 4 is a block diagram illustrating aspects of a system which is configured with IPRID reputation assessment functionality.
Figure 5:
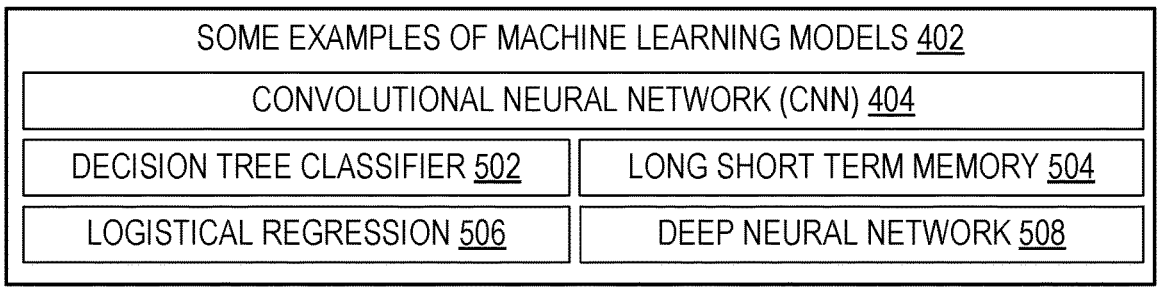
FIG. 5 is a block diagram illustrating some examples of some machine learning model technologies.
Figure 6:
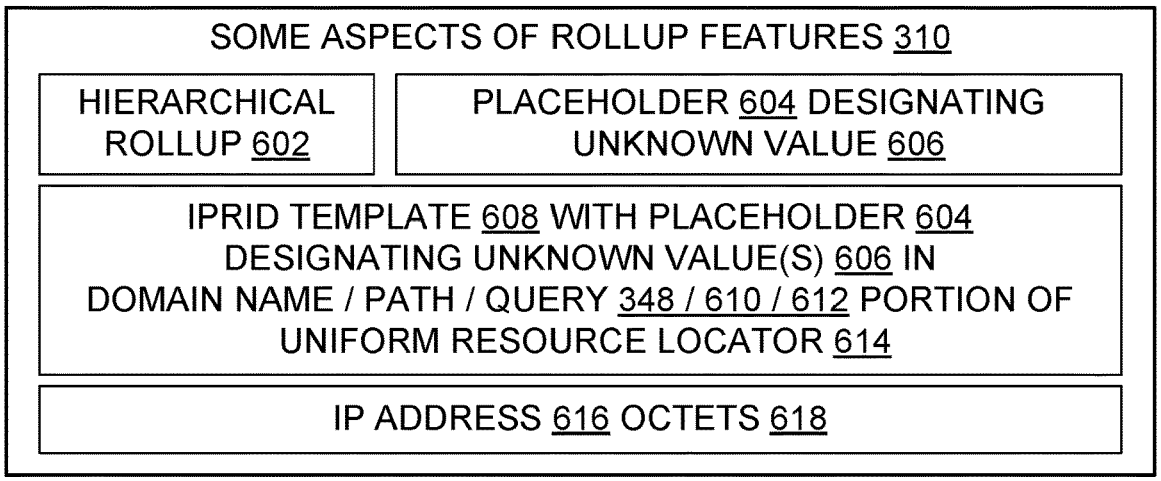
FIG. 6 is a block diagram illustrating some aspects of some rollup features that may be used in training a machine learning model.

FIG. 2 illustrates an environment 100 in which a client 200 communicates through a network 108 with a service 208 running on a server 206. The communications involve IPRIDs 202. In this example, a malicious IPRID may harm the client 200 or the server 206, for example by malware infection, and hence both systems 200, 206 are treated as guarded systems 210. These systems 210 are guarded against malicious IPRIDS at least in part by IPRID reputation assessment 212. In this example, the IPRID reputation assessment 212 is performed in parallel with network communications, but one of skill will acknowledge that in other embodiments IPRID reputation assessment 212 may be performed in line with network communications, or be performed both in line and in parallel.

FIGS. 3 through 7 illustrate various aspects and examples related to IPRID reputation assessment 212. They are discussed as appropriate at various points in the present disclosure.

Figure 8:
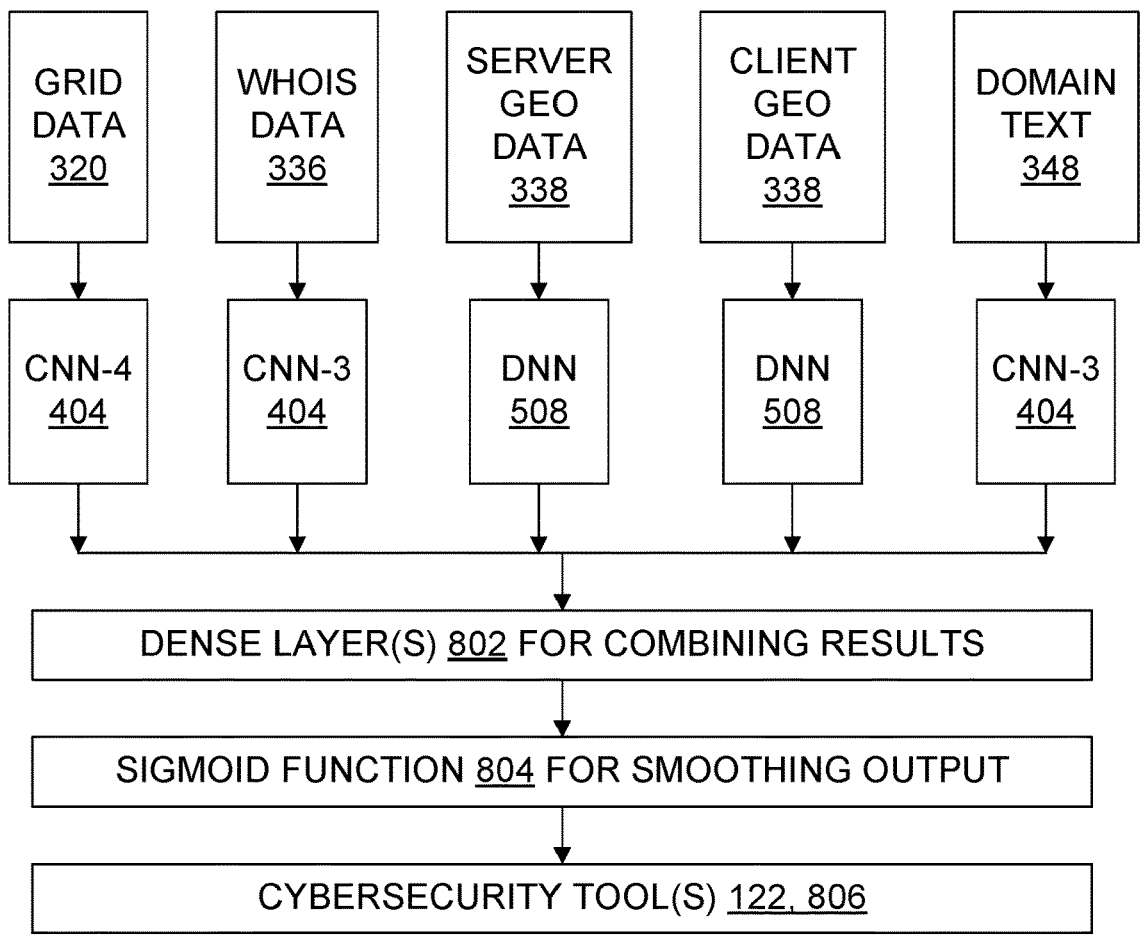
FIG. 8 is a data flow diagram illustrating some aspects of an example IPRID reputation assessment system which includes multiple machine learning models.

FIG. 8 illustrates a family 800 of IPRID reputation assessment systems 102. Each member of this particular family has the components shown in FIG. 8 or functionally similar components. However, family 800 members may differ in implementation, e.g., by having different data grid 320 dimensions, different data encodings, different amounts of data, different underlying computing hardware, or different numbers of CNN layers than those indicated in FIG. 8.

One example embodiment based on family 800 includes 7×5×16 grid data 320. The value 7 corresponds to the 7 days in a week, and the 5 corresponds to five weeks. The value 16 corresponds to use of 16 different aggregate data sources. The data grid 320 is fed to a convolutional neural network identified in FIG. 8 as CNN-4 404. One suitable CNN-4 includes a 4-layer convolutional with log(N+1) cleanup, batch normalization, max pooling, and leaky relu (rectified linear unit) activation.

In this example embodiment, whois data 336 includes one-hot encoded raw text from whois query results, which may have been parsed to extract information such as domain name, registrant, registrant address, and registration date. Familiar one-hot encoding techniques may be used. The whois data 336 is fed to a convolutional neural network identified in FIG. 8 as CNN-3 404. One suitable CNN-3 reduces one-hot encoding into N-grams, and includes a 3-layer convolutional with 3 addition layers 802, batch normalization, max pooling, and leaky relu (rectified linear unit) activation.

In this example embodiment, server geolocation data 338 is fed to a deep neural network (DNN) 508 with raw features, such as a latitude designated value containing raw latitude data and a longitude designated value containing raw longitude data. Raw means no normalization. Other designated features may contain a country value, a region value, a time zone value, or other geolocation data pertaining to the server 206. Client geolocation data 338 with the same or similar raw features pertaining to the client 200 is fed to another deep neural network (DNN) 508.

In this example embodiment, domain text 348 includes one-hot encoded domain names 348. The domain text represents the domain to which the other data 320, 336, 338 pertains.

Figure 9:
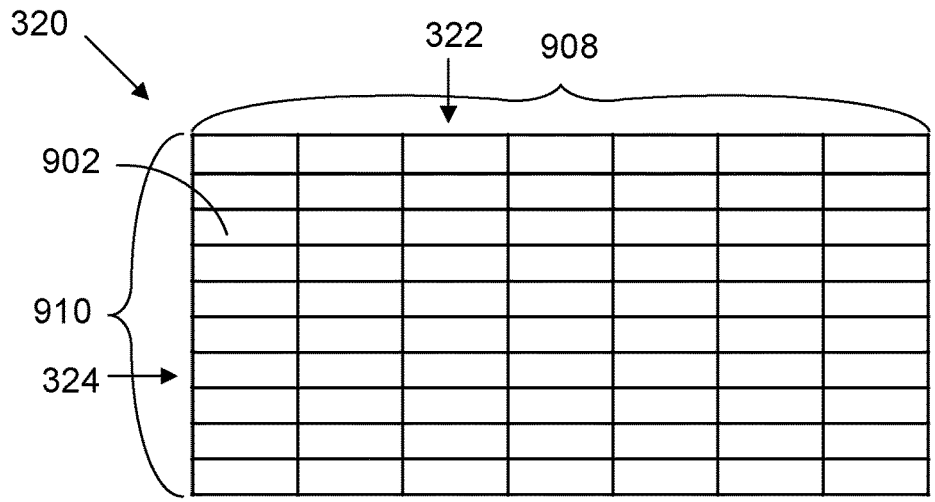
FIG. 9 is a data organization diagram illustrating a grid in which IPRID reputation assessment training data is organized with weekday columns and week rows.

FIG. 9 illustrates a data grid 320 having 7 weekday columns 322 (one for each day of the week) and 10 week rows 324. The value 10 has been determined experimentally to be sufficient to provide accurate IPRID labels using a system 800, but a larger number of weeks may also be used with a system 800, and other values for the number 910 of weeks may be appropriate for other embodiments.

In some embodiments, the grid 320 is organized such that each cell 902 includes an aggregated value 308 for a particular date 318 and a particular kind of aggregate data. The kind of data may be, e.g., a number 708 of HTTP code 200 responses 706, or a count 780 of network errors, or another kind of aggregate data 308 shown in FIG. 7 or data otherwise aggregated for feeding to a model 402.

In some embodiments, the grid 320 is organized such that the most recent full day of aggregate data is located in the top left corner of the grid. The aggregate data for one day prior to that is located one cell 902 to the right in the first row, the aggregate data for one week prior is located in the second row of cells, and so on, with the least recent date's data located in the bottom right cell of the grid.

Figure 10:
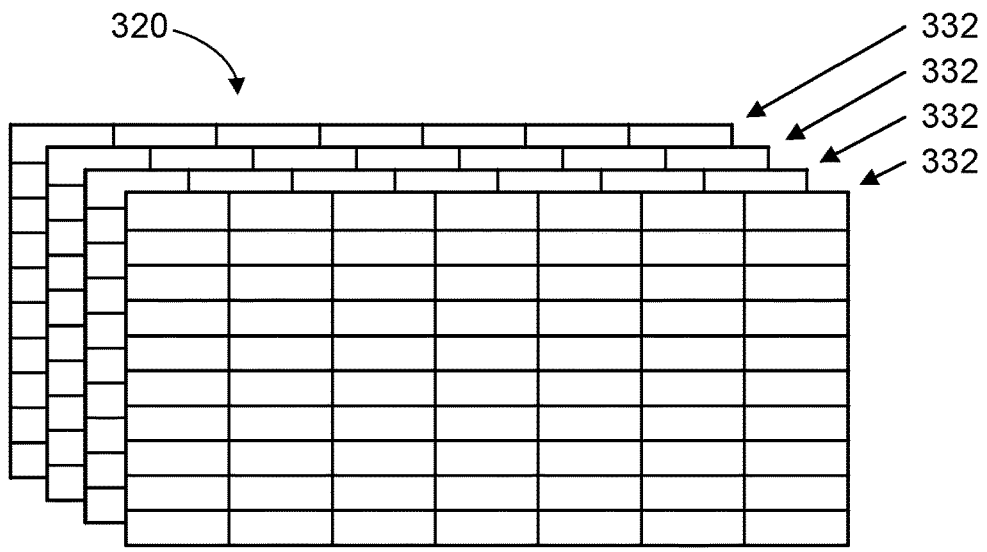
FIG. 10 is a data organization diagram illustrating IPRID reputation assessment training data organized in vector space planes that may correspond to data sources, to data meanings, or to both.

FIG. 10 illustrates multiple two-dimensional data grids 320 organized to form a larger N-dimensional data grid, with N>2. The grid is conceptual, not necessarily literal. The larger data grid 320 includes individual planes 332, which in this example are 2-dimensional but may have more than 2 dimensions in other situations. Each plane 332 corresponds to a data 312 source 328, or a data 312 meaning 330, or both. For example, data from each of the following data sources could have its own plane 332: standard data, phish feed count, customer report count, other source count. Similarly, data having each of the following meanings could have its own plane 332: IPRID submission counts, "good IPRID" counts, "bad IPRID" counts, HTTP code 200 counts.

Figure 11:
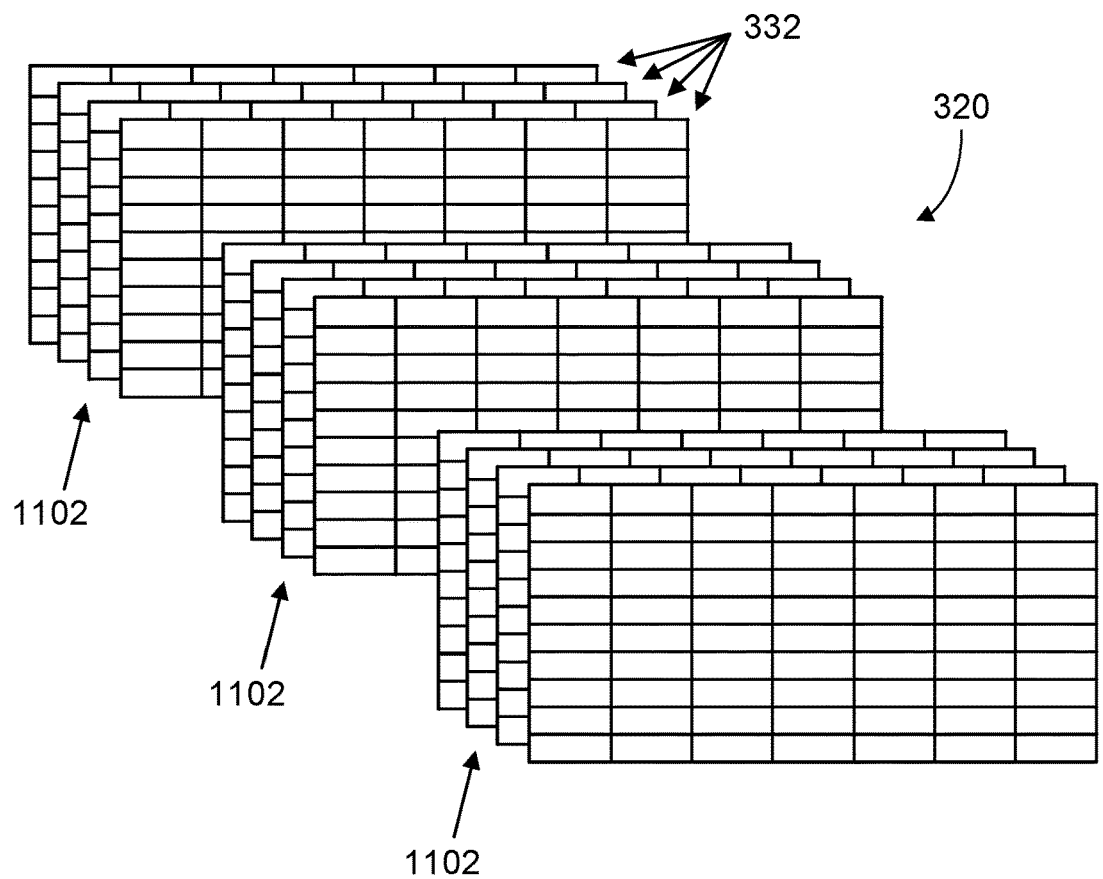
FIG. 11 is a data organization diagram illustrating IPRID reputation assessment training data organized in groups of vector space planes.

FIG. 11 illustrates multiple two-dimensional data grids 320 organized in groups 1102 to form a larger N-dimensional data grid, with N>2. The grid is conceptual, not necessarily literal. Groups may correspond, e.g., to data meanings. For example, data with each of the following meanings could have its own group 1102: all counts for a domain, all counts for the $0^{th}$ rollup of the domain, and so on, up to and including all counts for the $N^{th}$ rollup of the domain.

Figure 12:
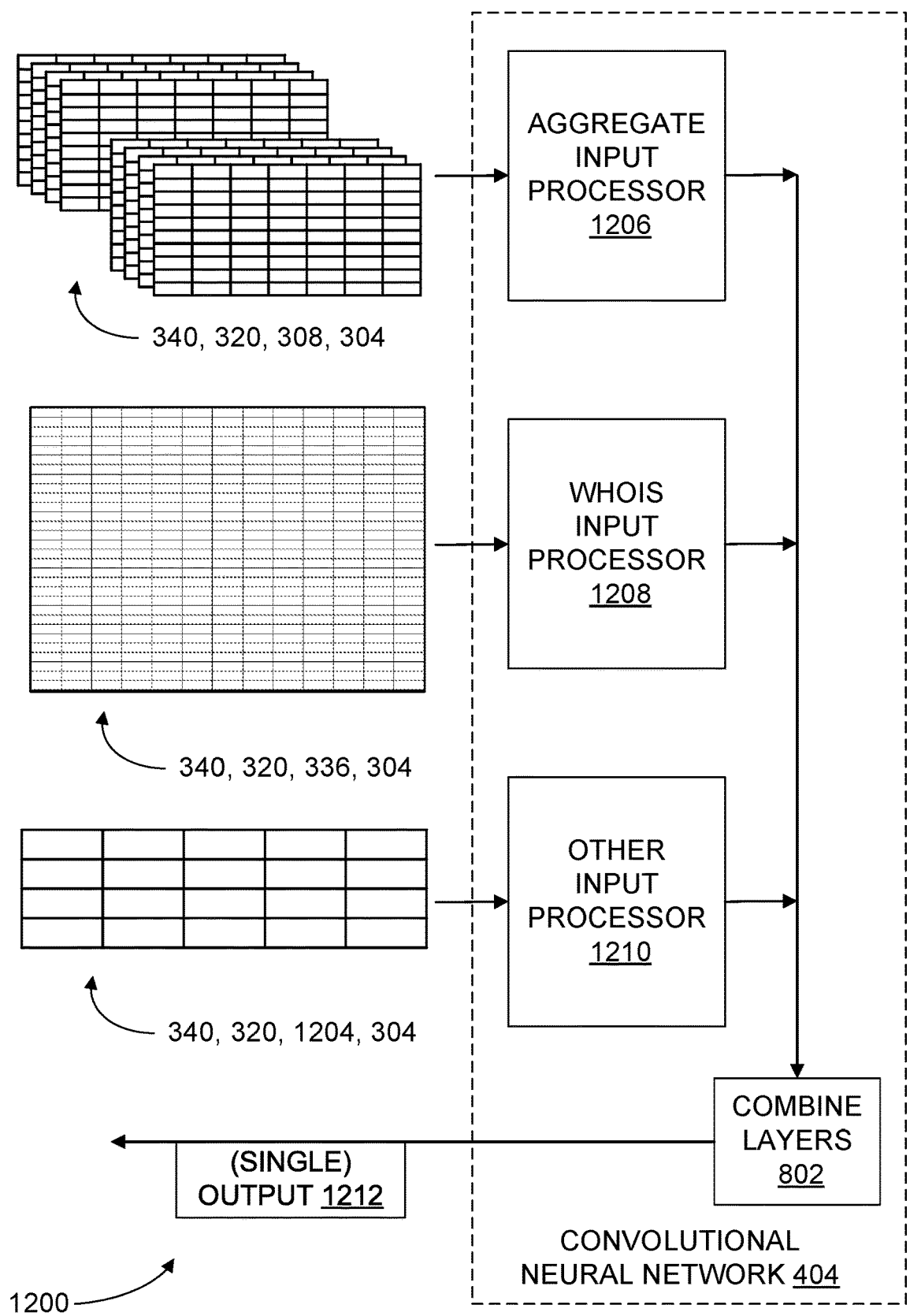
FIG. 12 is a data flow diagram illustrating some aspects of an example of another IPRID reputation assessment system, with training data organized in branches.

FIG. 12 illustrates a family 1200 of IPRID reputation assessment systems 102. Each member of this particular family has the components shown in FIG. 12 or functionally similar components. However, family 1200 members may differ in implementation, e.g., by having different data grid 320 dimensions, different data encodings, different amounts of data, different underlying computing hardware, or different numbers of CNN layers 802.

FIG. 12 shows training data organized in three branches 340. The top branch in this example embodiment includes rollup aggregate information, such as all counts for a domain and all rollups for the domain. This top branch is fed into an aggregate input processor 1206 having 1 to N layers 802. The middle branch in this example embodiment includes non-aggregate 1204 whois data, such as one-hot encoded text from whois data. This middle branch is fed into a whois input processor 1208 having 1 to M layers, where M may equal N, or not. The bottom branch in this example embodiment includes non-aggregate data 1204 from sources other than whois. This middle bottom is fed into a different input processor 1210 having 1 to K layers, where K may equal N or M or both, or not. In some variations, the data sources "WhoIs" and "Domain Text" are expandable to use rollup information, so along with the domain "Whois branch", a variation could also create an input branch for "rollup 0 Whois branch". Other embodiments may use data from different data sources.

Some embodiments use or provide an IPRID reputation assessment functionality-enhanced system, such as an example system 400, an example system 800, an example system 1200, or another system 102 that is enhanced as taught herein. The IPRID reputation assessment system includes a memory 112, and a processor 110 in operable communication with the memory. The processor 110 and the memory 112 are configured in a trained convolutional neural network 404 which was trained using IPRID reputation training data 304. The IPRID reputation training data 304 includes at least one of the following: aggregate features 308 based on aggregated data about respective IPRIDs 202, or rollup features 310 based on hierarchical rollups of data about IPRIDs 202 which include placeholders 604 designating 1408 unknown values 606. The IPRID reputation assessment system is configured to enhance security of a guarded system 210 by performing at least one of the following: the trained convolutional neural network inferring a label 326 which distinguishes a malicious IPRID from other IPRIDs, or the trained convolutional neural network producing a lookup table 408 which distinguishes malicious IPRIDs from other IPRIDs.

In some embodiments, the convolutional neural network 404 is trained using IPRID reputation training data 304 that includes at least three of the following aggregate features 308: a count 736 of distinct submissions, a count 740 of distinct final hostnames, a count 744 of submissions of a particular IPRID, a count 748 of submissions of a particular IPRID from within a document as opposed to from use in a network communication protocol exchange as a uniform resource locator, a count 752 of redirects to a particular IPRID, a count 758 of classifications of a particular IPRID as non-malicious, a count 776 of times a particular IPRID was unreachable due to an endpoint network error, a count 764 of classifications of a particular IPRID as a malicious phishing IPRID, a count 770 of classifications of a particular IPRID as a malicious IPRID other than a phishing IPRID, a count 780 of any network errors encountered when attempting to reach a particular IPRID, a count 708 of HTTP code 200 responses encountered when attempting to reach a particular IPRID, a count 712 of HTTP code 301 responses encountered when attempting to reach a particular IPRID, a count 704 of HTTP code 0 responses encountered when attempting to reach a particular IPRID, a count 716 of HTTP code 400 responses encountered when attempting to reach a particular IPRID, a count 720 of HTTP code 401 responses encountered when attempting to reach a particular IPRID, a count 724 of HTTP code 403 responses encountered when attempting to reach a particular IPRID, a count 728 of HTTP code 404 responses encountered when attempting to reach a particular IPRID, a count 732 of HTTP code responses other than individually tallied response codes were encountered when attempting to reach a particular IPRID. Also, some embodiments include at least two of the listed aggregate features 308, and some include a different number in the range from four to eighteen of the eighteen listed aggregate features 308.

One of skill will acknowledge that in some environments, HTTP code 0 is used as a generic error for cases when the domain is not a real domain format or something catastrophic occurred, and thus HTTP code 0 is not necessarily as widely recognized as other HTTP response codes.

One of skill will acknowledge that HTTP code 301, indicating a domain has moved permanently, may be encountered when attempting to reach an original IPRID. This code may be encountered, e.g., in content delivery network (CDN) redirects 346 when an attacker sends the original link 344 that pointed to a valid CDN location and then presents an HTTP 301 redirect to a malicious destination URL. Attackers may use this redirection approach to mass produce final URLs 738. With respect to counting redirects 346, consider the following sequences:

OriginalURL_1>>redirect>>Final_IPRID_X
OriginalURL_2>>redirect>>Final_IPRID_X
. . .
OriginalURL_n>>redirect>>Final_IPRID_X In this situation, the redirects count 752 indicates the number of original URLs that end up at the Final IPRID.

In some embodiments, the convolutional neural network 404 is trained using IPRID reputation training data 304 that includes at least two of the following aggregate features 308: a number of submissions (such as DistinctSubmissions, Count, or NonUrlParent noted elsewhere herein), a successful detonation statistic (such as Code_200), a failed detonation statistic (such as SiteUnavailableCount, ErrorCount, Code_0, Code_400, Code_401, Code_403, or Code_404 noted elsewhere herein), a verdict statistic indicating classification as non-malicious (such as GoodCount), or a verdict statistic indicating classification as malicious (such as PhishCount or BadCount). Other embodiments include more than two of the listed kinds of aggregate features 308. Some include other kinds of aggregate data, e.g., threat intelligence data from commercial vendors. Some embodiments include hand graded or human labeled training data 304, as aggregate features or otherwise. Some training data 304 includes user feedback indicating phish examples from a domain, or a good example 306 from a domain such as one related to previous mistakes.

When one or more signals other than the label are delayed, there may be impact to the training data 304. For delayed data signals, some embodiments train with the counts that were known at the final day of the example (which is the time of the label). Accordingly, all delayed signals have at least two relevant dates: the date the problem occurred (related to a submission on that date), and the date the user/entity submitted the feedback to the system. When one creates the training data, one may ensure that the final date is greater than or equal to the feedback date, before aggregating by the submission date. This helps ensure that the model only uses the data that was known before the label date. After that step the data can be treated the same as the rest of the data. In some embodiments, data is aggregated by submission day when the feedback date is older than the final aggregation date. This is technically true of all aggregates, but is noted here because with most aggregates one may assume that the signal comes at the same time as the submission.

In some embodiments, the convolutional neural network 404 is trained using IPRID reputation training data 304 that includes at least one of the following rollup features 310: a rollup aggregating data for an IPRID template 608 which includes a domain name portion 348 of a uniform resource locator, wherein the domain name portion includes a placeholder 604 designating an unknown value (such as "<unknown>.bar.com"); a rollup aggregating data for an IPRID template 608 which includes a path portion 610 of a uniform resource locator, wherein the path portion includes a placeholder 604 designating an unknown value (such as "www2.foo.bar.com/<unknown>/phishingpageX"); a rollup aggregating data for an IPRID template 608 which includes a query portion 612 of a uniform resource locator, wherein the query portion includes a placeholder 604 designating an unknown value (such as "www.foo.bar.com/path?user=<unknown>"); or a rollup aggregating data for an IPRID template 608 which matches multiple IP addresses 616 or multiple IP address octets 618 or both, and includes a placeholder 604 designating an unknown value (such as "1.2.<unknown>"). Some embodiments include at least two, or at least three, or all four of the listed kinds of rollup features.

In some embodiments, the convolutional neural network 404 is trained using IPRID reputation training data 304 that is characterized in at least one of the following ways: the training data is free of combination features 314, the training data is organized 1410 as a grid 320 having weekday columns and week rows, the training data is organized in vector space planes 332 that correspond to data sources, the training data is organized 1410 in vector space planes 332 that correspond to data meanings, the training data is organized 1410 in input branches 340 that correspond to groups of data having the same meaning, the training data includes original domains 344 as opposed to domains 750 reached through redirection, or the training data includes domains 750 reached through redirection 346. Some embodiments have training data that is characterized in at least two of the listed ways, or at least three, and so on up to and including data 304 that is characterized in all of the listed ways.

Some embodiments focus primarily or exclusively on assessing domain reputation for the "original" URL 344, e.g., the actual URL that shows up in emails. The original URL is the URL a user would see before a redirect 346, e.g., "bit.ly\aaabbb". However, such an embodiment may be modified to also work with the final URL domain 750, which is the landing page after redirection 346.

Some embodiments include an instance of a lookup table 408 which distinguishes malicious IPRIDs from other IPRIDs 202. The lookup table instance may include IPRIDs and corresponding maliciousness probability values 412 for a particular corpus 410 of IPRIDs, such as IPRIDs seen during a specified time period or IPRIDs seen by a particular network device or set of network devices.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples of component names, data sources, optimizations, algorithmic choices, URLs, implementation choices, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 13 illustrates a family of methods 1300 that may be performed or assisted by an enhanced system, such as system 400, system 800, system 1200, or another IPRID reputation assessment functionality-enhanced system as taught herein. FIG. 14 further illustrates IPRID reputation assessment-based cybersecurity 1322 enhancement methods (which may also be referred to as "processes" in the legal sense of that word) that are suitable for use during operation of a system which has innovative functionality taught herein. FIG. 14 includes some refinements, supplements, or contextual actions for steps shown in FIG. 13. FIG. 14 also incorporates steps shown in FIG. 13. Technical processes shown in the Figures or otherwise disclosed will be performed automatically, e.g., by suitably configured executing cybersecurity tools 806, unless otherwise indicated. Processes may also be performed in part automatically and in part manually to the extent action by a human administrator or other human person is implicated, e.g., in some embodiments a human administrator may specify a digital storage location from which to read training data 304. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 13 and 14. Steps may be performed serially, in a partially overlapping manner, or fully in parallel. In particular, the order in which flowchart 1300 action items or flowchart 1400 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide an IPRID reputation assessment method, including the following steps: obtaining 1306 IPRID reputation training data 304 which includes rollup features 310 that are based on hierarchical rollups of data about IPRIDs which include placeholders designating unknown values; training 1308 a machine learning model using the IPRID reputation training data; and utilizing 1310 the trained machine learning model by producing 1314 a lookup table which distinguishes malicious IPRIDs from other IPRIDs.

In some embodiments, training data is expanded 1414. Thus, a method may be characterized in that the IPRID reputation training data includes label tuples 406, with each label tuple having an IPRID 202, a date 318, and a label 326. Further, obtaining 1302 IPRID reputation training data includes expanding 1414 training data by date to include a set of label tuples which all have the same IPRID and the same label but have different dates. Also or instead, a method may be characterized in that the IPRID reputation training data includes label tuples 406, with each label tuple having an original IPRID 344, a final IPRID 346, a date 318, and a label 326. Further, obtaining 1302 IPRID reputation training data includes expanding 1414 training data by date or by original IPRID to include a set of label tuples which all have the same final IPRID and the same label but have different dates or different original IPRIDs or both.

In some embodiments the label feature combinations can be arbitrarily increased by choosing multiple previous time periods to join with the aggregates. Some embodiments increase 1414 a label set (set of label items) by duplicating the label, but choosing earlier dates. They can take a label {domain, date, LABEL} and create several more labels automatically:
{domain, date-1d, LABEL}
{domain, date-2d, LABEL}
. . .

Label expansion (which is assumed to be automatic) gives multiple benefits. The number of labels is increased without significant additional expense. This can be important because labels are often the highest cost portion of an ML project, and often in short supply. Raw data can be nearly free in comparison.

Label expansion also enhances predictivity. An embodiment may predict a label for an IPRID given earlier data about the IPRID. Since the join is by {domain, date} the features (inputs aggregated in a plane, e.g., as raw aggregates) are normally different, which gives the CNN more variety. So this expansion technique can be much better than just duplicating the label and features. Also, by walking back through the earlier days, the CNN becomes more predictive because now it has to predict a label that will not occur for several days. An embodiment can still use labels that occurred after that day if it has them. For example 7 days ago foo.bar.com might have been new, then 6 days ago the embodiment got a label for it. The embodiment can use the label from 6 days ago even while the training process knows that 7 days ago foo.bar.com was new.

In some embodiments, obtaining 1302 includes joining 1416 tuples. For example {domain, date, label} tuples may be joined with one or more rollup features 310. As used herein, tuple notation {a, b, c} means that a tuple includes at least elements or features a, b, and c. In some embodiments, obtaining 1302 includes joining 1416 {domain, date, label} tuples with one or more aggregate features 308 that are based on aggregated data about respective IPRIDs, and training 1308 includes feeding 1418 {domain, date, label, aggregate(s)} tuples 406 to a neural network, e.g., a CNN 404 or a DNN 508.

Some embodiments operate at scale. In particular, some embodiments produce 1314 a lookup table including IPRIDs and corresponding maliciousness probability values for more than one hundred thousand IPRIDs. The value one hundred thousand was chosen because it is recognized as a cutoff in website popularity, and one of skill informed by the teachings herein will acknowledge that operating at scale implies dealing with many websites that are not very popular but nonetheless may pose a security risk.

In some embodiments, obtaining 1302 includes generating 1426 a base slot 1428 for a domain, generating 1426 a rollup slot 1430 for the domain, assigning 1432 to the base slot a value that depends at least in part on whether a reputation score is known for the domain (e.g., by, zeroing the slot to indicate an unknown reputation), and assigning 1432 a rollup value to the rollup slot. A slot corresponds to a set of aggregates 308 and a level of hierarchical rollup 1406. Examples are discussed elsewhere herein.

In some embodiments, the machine learning model 402 includes a convolutional neural network 404, and training 1308 includes feeding 1424 the convolutional neural network a grid 320 which has separate planes 332 for respective aggregate features 308. FIGS. 10 and 11 show data 304 examples.

In some embodiments, the machine learning model 402 includes a convolutional neural network 404, and training 1308 includes feeding 1424 the convolutional neural network a grid 320 of label tuples which contain feature values that are calculated 1422, from feature data, relative to a receipt date of the feature data. For instance, in some embodiments training data 304 is organized 1410 such that the top left corner of a feature map 320 for a label is always Yesterday, relative to the label receipt date. So if the label was received on Tuesday, May $14^{th}$, the upper left hand corner would be the data for Monday, May $13^{th}$, the data to the right of it is always the day before that. This means for the training set or test set the features are built relative to when the data arrived. This can complicate aggregation and joining the data, but helps ensure that sure the model is using Yesterday's aggregates to predict a label for today. If the label date was the first time a system 212 saw that domain, the data is all zeros. This is a desirable behavior since it makes the features clear when a domain is new, versus a domain that is not new but may not have any labels associated with it yet.

In some embodiments, a trained model 402 uses Yesterday's aggregates to predict a label for today. This is an example of a predictive model. Similarly, in some embodiments producing 1314 a lookup table includes inferring 1312 a label for a current date based on aggregate feature data for prior dates.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as training data 304, machine learning models 402, and lookup tables 408, in the form of data 118 and instructions 116, read from a removable storage medium 114 and/or another source such as a network connection, to form a configured storage medium. The configured storage medium 112 is capable of causing a computer system 102 to perform technical process steps for IPRID reputation assessment, as disclosed herein. The Figures thus help illustrate configured storage media embodiments and process (a.k.a. method) embodiments, as well as system and process embodiments. In particular, any of the process steps illustrated in FIG. 13 or 14, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform an internet protocol resource identification (IPRID) reputation assessment method. This method includes: obtaining 1302 IPRID reputation training data 304 which includes at least one of the following: aggregate features 308 that are based on aggregated data about respective IPRIDs, or rollup features 310 that are based on hierarchical rollups of data about IPRIDs which include placeholders 604 designating unknown values; training 1308 a machine learning model using the IPRID reputation training data; and utilizing 1310 the trained machine learning model by inferring 1312 a maliciousness probability for at least one IPRID.

In some embodiments, training 1308 uses IPRID reputation training data that includes both aggregate features and rollup features. In some of these, utilizing 1310 the trained machine learning model includes inferring 1312 respective maliciousness probabilities for at least one hundred thousand IPRIDs and also includes producing 1314 a lookup table which includes the IPRIDS and the respective maliciousness probabilities.

In some embodiments, training 1308 uses IPRID reputation training data that includes at least two of the following: a feature based on counts 342 of classifications of a domain (such as GoodCount, PhishCount, BadCount discussed elsewhere herein), a feature based on whois data 336, a feature based on geolocation data 338, or a feature based on tenant data 334.

In particular, in some embodiments and some situations reputation may be assessed in the context of a specific tenant. In cases of targeted attacks, a domain could be "clean" for every company except the targeted companies. This may be viewed as a variant of geo-targeting. Certain bad IPIRDs may have a high propensity or concentration to a GEO (a geolocation) when attackers target a particular GEO, so tenant data may be useful in determining the relevance of the reputation based on GEO. Similarly, certain bad IPRIDs may have a high propensity or concentration to a specific tenant (e.g., a hypothetical Contoso company or an actual company) when attackers target a particular company. Also, a certain bad IPRID may have a high propensity for or shown concentration in a specific industry vertical (e.g., targeting Oil and Gas, Shipping, Healthcare companies, Government agencies) when attacker target a group of companies. Fed appropriate training data, a model will make these correlations and detect these malicious IPRIDs and patterns of attack.

Aggregation and rolling up may be present or absent in various combinations. In some embodiments, training 1308 uses IPRID reputation training data 304 that includes at least two of the following: a feature based on raw aggregate data, a feature based on non-aggregate data, a feature based on aggregate rollup data, or a feature based on non-aggregate rollup data.

Various machine learning technologies may be employed in embodiments. In some embodiments, utilizing 1310 the trained machine learning model includes utilizing at least one of the following: a convolutional neural network 404, a decision tree classifier 502, a long short term memory model 504, a logistical regression model 506, or a deep neural network 508.

ADDITIONAL EXAMPLES AND OBSERVATIONS

One of skill will recognize that not every part of this disclosure, or any particular details therein, are necessarily required to satisfy legal criteria such as enablement, written description, or best mode. Also, embodiments are not limited to the particular data types, data formats, networks, protocols, tools, identifiers, fields, data structures, functions, capitalizations, or other implementation choices. Any apparent conflict with any other patent disclosure, even from the owner of the present innovations, has no role in interpreting the claims presented in this patent disclosure. With this understanding, which pertains to all parts of the present disclosure, some additional examples and observations are offered.

With the benefit of teachings provided herein, one of skill will acknowledge that domain reputation may be part of a foundational system which has some knowledge about many relevant domains which are commonly seen by threat management tools. In some situations, domain reputation only looks at a hosting domain, as opposed to a broader URL reputation system which looks at an entire URL/Path/Parameters. Some implementations specifically look at an original URL domain, while other versions may look at the final URL or be a combination of the redirection chain.

In some environments using a reputation system, nearly all domains will always be unlabeled. Also, even when domains are labeled, some labeling results can be ambiguous. Take for example a hypothetical well known domain that has been seen hundreds of times per day by a website scanning tool 806. The domain may have three labels, which include two Good labels and one (misclassified) Phish label. Using these labels by themselves leads the machine learning to conclude that the "good" examples have some properties that make them good, including the domain, but possibly also some other features, while the misclassified "Phish" label has some properties which make it phish. In this case it is entirely possible that domain is not even scored and may not affect the final verdict. This situation is undesirable since the hosting domain is of extreme importance when classifying as phish. This particular example has three labels for a single domain, and even then, it is ambiguous. A commercial tool 806 operating at scale encounters hundreds of thousands—sometimes millions—of domains. It is prudent to assume that in many environments, sufficient data will simply be unavailable through traditional channels to correctly label and score all of the millions of domains seen.

Some of the innovative approaches described herein generate features which are common for all domains seen. This allows one to build a different model, which looks at those features and decides on a more accurate score specifically for that domain, even if there are not enough labels to score it more directly or by familiar mechanisms. The features may include some form of how long one's history is with this domain, and indicate how trustworthy the domain has been in the past.

Revisiting the same misclassified domain example as above, in some embodiments features may be based on how much volume and what kinds of scores assessment 212 has generated with this domain in the past. An embodiment may use the fact that the domain has been seen hundreds of times, and implicitly group the domain with other domains that were also seen hundreds of times, for instance. In general the labels on that group are likely to be "good', and this one "Phish" label will stick out as an anomaly. But a machine learning model may have a difficult time getting rid of that anomaly and the label will show up as a false negative. This is actually a much more correct state then above, since we have assumed the "Phish" label was actually a human mistake.

This approach does mean that if the trustworthiness of the domain changes (such as in cases of compromised domain security), the assessed rating should change. This may lead to some false negatives occurring when a domain becomes freshly compromised, but would often be a good tradeoff against the avoided false positives when the domain is behaving normally. Some embodiments herein may avoid, or at least reduce, such false negatives. Although the domain is the same before and after the compromise, the fact that the domain is compromised leads to changes in reputation assessment 212 features associated to that domain. So one may see a sudden spike in redirect counts or unavailable sites, for example, or the pattern of submissions may change. An embodiment employing machine learning as taught herein may accommodate this duality because it is not looking at the domain, it is only looking at the aggregate features. So if a similar domain was compromised and demonstrated a similar new pattern, that label would become more relevant for scoring this domain, for today's data. Those labels may be given a higher relevance than the actual labels associated with this domain (but for a day where it was not compromised). An issue with competing labels may arise when the labels occur on the same day, so they have the same features. This can happen with large domains, or it can happen when using label expansion 1414.

Some embodiments allow for fast results in production systems without requiring additional data other than the domain, e.g., by producing lookup tables for use by production systems. Some embodiments are updated daily to keep up with changing data. Some do not any require additional hardware or data to be available on production machines.

In some internal experimental implementations, assessment 212 runs in DataBricks® software on an Apache Spark™ engine (DataBricks is a mark of Databricks, Inc.; Spark is a mark of The Apache Software Foundation). An existing training system is leveraged according to teachings herein to create the labels for training sets and testing sets, and ships that information over to the DataBricks using Azure® Machine Learning software (mark of Microsoft Corporation). Using the DataBricks software, raw data is cooked into features, then joined with the labeled set. Training and test sets are kept separate. An additional 'application' set is constructed using all of the known domains. The labeled training set features are used to build a fresh CNN model using the Microsoft Cognitive Toolkit (CNTK). A false positive/false negative threshold table is constructed using the test set. Current domains are also run through the model.

As to a model component used in reputation assessment 212, in some cases the features for the domain are built by looking at a detonation service's history with that domain. The Sonar™ tool is a Microsoft tool 806 with a URL detonation service, for example, but other detonation services may also be employed. By building a map based on detonation history, one can differentiate between domains which were involved with phishing before from those which have a clean history. Teachings herein also allows an embodiment to estimate volumes of those domains, which can be useful in determining impact of blocking them.

Also, in some cases features are created by evaluating examples from Exchange® Online mail flow URL detonation logs or other prior IPRID checks or URL detonations and aggregating them by the domain and rollups, then grouping by day (mark of Microsoft Corporation). The aggregation results in a different aggregate for each datatype for each day, and the data is arranged in 7 days, to allow for meaningful relationships between cells, like making sure that weekly reoccurring behaviors align vertically while day-to-day changes align horizontally. For instance as shown below, there are two days which seem to have slightly higher volume as their respective total count, and those days per week align vertically:

| 18 | 7 | 6 | 7 | 3 | 5 | 14 |
|----|---|---|---|---|---|----|
| 22 | 6 | 9 | 8 | 2 | 8 | 17 |

In one implementation, data continues in this manner for fifteen weeks, arranged in fifteen rows 324.

In one implementation, on top of this total count 786 the training data includes different aggregates 308 for several other pieces or kinds of data: Number of Submissions, Good Verdicts Count, SiteUnavailable Count, Phish Verdicts Count, Bad Count, Error Count, Code_200, Code_0, Code_400, Code_401, Code_403, Code_404, and All other codes.

In this implementation rollups are also aggregated in the same manner and a single example 406 has features for itself, plus 3 rollups, starting with the TLD. If the example was rolled up less than 3 times, those values are zeros. If the example was rolled up more than three times then any intermediate rollup results do not show up in the features.

This implementation zeroes planes that match <unknown>. This tells the neural network a rollup occurred. When <unknown> is encountered, the neural network uses zeroes to calculate probability 412.

In some embodiments, some more detailed meaningful features such as ratios of good vs phish, large increases or decreases in volumes, and how often the domain returns a code 200 versus a code 400, are left to the CNN to calculate as appropriate. Having multiple layers 802 allows a CNN 404 to perform correlations and so forth between the various layers and between the cells, while placing the temporal and weekly re-occurrence nearby to allow the network to correlate if it is meaningful. A goal of this approach is to save engineering time, and if the model is unable to perform a meaningful separation 1412, adding new layers as signals, and increasing the number of layers may help.

One CNN 404 has 3 layers, using Batch Normalization between each layer to allow for raw data to be passed in without much cooking or normalization. A pre-layer was also used in a prototype to perform a Log 10 on each value which makes the values closer to 1, but makes smaller number still show up clearly. Ratios between layers would be different with this additional layer, but the CNN performed acceptably with the change and produced correct models without causing Infinity/NegativeInfinity/NaN results.

Each of the layers in this particular implementation may be described as a 25×7×15 layer, where 15 represents the number of week rows in the training data grid, 7 represents the number of daily columns in the training data grid, and 25 represents the number of data planes, that is, the number of kinds of aggregate data such as FIG. 7 response code counts 704, 708, 712, 716, 720, 724, 728, 732, FIG. 7 submission counts 736, 744, 748, FIG. 7 classification counts 758, 764, 770, and so on per FIG. 7, plus non-aggregate data such as whois data 336, geolocation data 338, and tenant data 334. Output from the third 25×7×15 layer fed a 1×256 combining layer, which would then output 1316 a single result 1212 labeling the domain.

As to applying the model, after the trained model is built, it is applied against a current corpus of domains, using the most recent data available. This helps ensure that reputation results are up-to-date within a few days of the model being applied.

Some embodiments cache inference results. Rather than shipping the model 402 directly to production, the domains and their probabilities are stored as a lookup table 408. This allows an embodiment to avoid several complexities that may be unwanted. First, the lookup table is relatively simple and does not require any complex featurization. This allows one to implement the reputation system in Python Spark environments, even though the production lookup is done using C# (C-sharp). Crossing languages would be much more difficult if it relied on feature compatibility between the production application and the model building. Second, performing a lookup is computationally cheap, whereas evaluating a CNN is expensive. So the expensive portion of assessment is isolated to a handful of high-end machines which can run in a backend service rather than requiring upgrades on the machines running in production. Third, acquiring some features at runtime can be difficult to impossible because they are built from logs going back up to six months. By caching the results an embodiment does not need those features in production, it only needs the domain and the pre-calculated results lookup table. One of skill informed by the teachings provided herein will also acknowledge that it becomes easy to identify the difference between known and unknown domains, which is interesting from a security perspective. Unknown (e.g., very new) domains tend to be higher risk than known one, so an embodiment can keep up with rotating domains by marking all of them as unknown and applying the appropriate probability based on that fact.

There are tradeoffs in caching inference results. Caching the results in a lookup table trades off memory to allow for better computational performance at the time a particular domain is assessed. The amount of memory storing millions of domains in a lookup table can be large, typically allowing for 15-20 bytes per domain. The table 408 for lookups in a commercial production environment, e.g., for an enterprise or other large entity, is likely to require hundreds of megabytes of memory. However, this can be mitigated, e.g., by using MemoryMappedFiles or another functionality that allows several processes on a single machine to re-use the same memory.

In some embodiments, testing of the model 402 includes taking the pre-joined test labels and features and running them through the model. Various FP/FN data points can be taken to set thresholds on the final evaluation set. These thresholds can be used to group the results in a meaningful way such as all "good" domains which may not even need to be detonated to meet a desired FN rate, or "phish" domains which may be outright blocked and still allow operation below a desired FP rate.

In some internal implementations, one or more of the following tasks are employed. An AML Flow task is an Azure® ML flow which takes labeled examples from an Azure® Cosmos™ database and passes them to DataBricks software to be processed further (DataBricks is a mark of Databricks, Inc.; Azure and Cosmos are marks of Microsoft Corporation). After processing, several of those files are copied back to the database. One or more Featurization Spark™ Script tasks take label dates and aggregate a current summary into the feature tables to allow for model building and model testing, and update the single date of Yesterday to allow for building the reputation cache 408 (mark of The Apache Software Foundation). A CNTK model building script task employs a Python script to build the model 402, using a GPU or TPU or both for faster build when possible. The GPU, TPU, or other processor(s) can be reused to run through the test set and application set. A Run model CNTK Test Set task runs through the test set and builds a table of Label/Prediction pairs. These can be passed back to the Cosmos™ database to use the tools already there to build a receiver operating characteristic (ROC) curve and set thresholds. A Run model CNTK Application Set task runs the application set through the model and returns a (much larger) table of Label/Prediction pairs. These are also passed back to the Cosmos™ database to be included in the daily model 402. A Cosmos Script Thresholds task builds ROC and threshold data using the current tools and the data received back from DataBricks™ code. A Cosmos Script Reputation Table task creates the serialized table 408 which has the reputation data 410, 412 in it available for lookup.

As to Cosmos Script Build Model adaptations, in some variations, a Sonar™ tool or other detonation service model is adapted to handle data coming from the reputation system. The adapted tool or detonation service uses the model's reputation result for that example, based on the features that example had when it arrived. Thus, rather than performing the table lookup, this variation uses the result from the data passed back from the reputation system. The value is passed into the training system as a real number which can be weighted by the Vowpal Wabbit machine learning system or other learner. This allows the learner to use the value less or more, depending on how correctly it matches with the examples and their relative labels. Further reputation systems can be passed in in a similar way, possibly with the learning rate hyperparameter weight constrained to be >0 to avoid the reputation systems sign from being inverted. In some embodiments, inputs into the Vowpal Wabbit (VW) system include not only the raw probability but also an indication whether a rollup was performed, a volume of the domain (e.g., as a log bucket; this volume indicates to VW a relative confidence in the probability, with higher volume indicating greater confidence), and a logistic weight of the probability (this rescales the probability to a range from −15 to +15 per VW norms for weighting; 0.0 on this scale means a 0.50 probability).

Similarly, as to Cosmos Script Test Model adaptations, in some variations the feature is filled in by using the test feature set rather than the current reputation results to avoid cheating. A tester may want to run through all examples using the current reputation results which will give them an indication of what would result if this example value was seen today.

One of skill may be acquainted with the Keras neural network library. The edited Keras output below may be of interest. It describes layers 802 in an internal implementation CNN, and so is based on one of many models discussed herein. It corresponds to the top branch in FIG. 12 which reads in grid data. The output was lightly edited for inclusion here by removing cosmetic horizontal line separators and aligning columns:

| Layer (type) | Output Shape | Param # |
|---|---|---|
| lambda_3 (Lambda) | (None, 6720) | 0 |
| reshape_3 (Reshape) | (None, 7, 10, 96) | 0 |
| conv2d_7 (Conv2D) | (None, 7, 10, 64) | 55360 |
| batch_normalization_9 (Batch) | (None, 7, 10, 64) | 256 |
| leaky_re_lu_9 (LeakyReLU) | (None, 7, 10, 64) | 0 |
| conv2d_8 (Conv2D) | (None, 7, 10, 128) | 73856 |
| batch_normalization_10 (Batch) | (None, 7, 10, 128) | 512 |
| leaky_re_lu_10 (LeakyReLU) | (None, 7, 10, 128) | 0 |
| max_pooling2d_5 (MaxPooling2) | (None, 3, 5, 128) | 0 |
| conv2d_9 (Conv2D) | (None, 3, 5, 256) | 295168 |
| batch_normalization_11 (Batch) | (None, 3, 5, 256) | 1024 |
| leaky_re_lu_11 (LeakyReLU) | (None, 3, 5, 256) | 0 |
| max_pooling2d_6 (MaxPooling2) | (None, 1, 2, 256) | 0 |
| flatten_3 (Flatten) | (None, 512) | 0 |
| dense_5 (Dense) | (None, 512) | 262656 |

| Layer (type) | Output Shape | Param # |
| --- | --- | --- |
| batch_normalization_12 (Batch) | (None, 512) | 2048 |
| leaky_re_lu_12 (LeakyReLU) | (None, 512) | 0 |
| dropout_5 (Dropout) | (None, 512) | 0 |
| dense_6 (Dense) | (None, 256) | 131328 |
| dropout_6 (Dropout) | (None, 256) | 0 |
| ScoreLayer (Dense) | (None, 1) | 257 |
| activation_3 (Activation) | (None, 1) | 0 |
| Total params: 822,465 | | |
| Trainable params: 820,545 | | |
| Non-trainable params: 1,920 | | |

As further illustration of aggregate features 308, one internal implementation employed the following list of raw aggregate features. Raw aggregate data is an example of raw features. These data are organized first individually as a 7×10 matrix, then as 16 input planes. This 7×10×16 group may also be referred to as an "aggregate set".

DistinctSubmissions is the number 736 of distinct submissions seen on this day; the Sonar™ tool may see multiple domains in a single submission, or may see the same domain multiple times in a submission.

FinalHostnameCount is the number 740 of distinct final hostnames seen on this day. One of skill informed by the teachings herein will acknowledge that a system 212 may assess reputation for pre-redirect domains, while recognizing that for landing page domains this aggregate would be different.

Count is total number 786 of times this domain was seen by the Sonar™ tool on this day.

NonUrlParent is the number 748 of times this domain was seen from other file types such as PDFs or Microsoft Word® documents.

OrignalEndsWith is the number 752 of times this domain matches the domain from the final URL, this effectively detects when redirects were used.

GoodCount is the number 758 of times the Sonar™ tool called this domain or rollup "Good".

SiteUnavailableCount is the number 776 of times the Sonar™ tool was unable to view the final site because of endpoint network error.

PhishCount is the number 764 of times the Sonar™ tool called this domain or rollup "Phish".

BadCount is the number 770 of times the Sonar™ tool called this domain or rollup "Bad" which is mutually exclusive with "Phish".

ErrorCount is the number 780 of network errors seen for this domain or rollup.

Code_200 is the number 708 of times the HTTP response code 200 was returned.

Code_0 is the number 704 of times the HTTP response code 0 was returned.

Code_400 is the number 716 of times the HTTP response code 400 was returned.

Code_401 is the number 720 of times the HTTP response code 401 was returned.

Code_404 is the number 728 of times the HTTP response code 404 was returned.

Code_Other is the number 732 of times any other HTTP response code was returned.

Some embodiments generate multiple aggregate sets, each of which is also referred to as "slot". One embodiment generate 1426 one slot 1428 for the base domain and five slots 1430 for the rollups of that base domain, totaling six slots. In this embodiment, these slots are always ordered the same. In one implementation this corresponds to 16×6=96 total planes 332 that the CNN 404 sees 1420. If the domain has fewer than five rollups, then the aggregate set for that entire slot is set to zero.

So for example consider a domain, a.b.com which is known. It will have slot values as follows. The base domain slot gets the aggregate set for "a.b.com". Rollup domain slot 0 gets data which corresponds to the aggregate set for the rollup ".com". Rollup domain slot 1 gets data corresponding to the aggregate set for rollup "b.com". Rollup domain slots 2-5 will all be zeros, since the domain does not have any more rollups.

Now suppose the domain "a.b.com" is unknown, while "b.com" and ".com" are still known. Then the slots would look be generated as follows. The base domain slot gets all zeros because "a.b.com" is unknown. Rollup domain slot 0 gets data which corresponds to the aggregate set for the rollup ".com". Rollup domain slot 1 gets data corresponding to the aggregate set for rollup ".b.com". Rollup domain slots 2-5 will all be zeros, since the domain does not have any more rollups.

In this manner data slots convey to the CNN that "a.b.com" is unknown, and the CNN will try to predict the label for all cases when that occurs, while knowing the data from ".b.com" and more generically ".com". This approach allows the CNN to know that the domain was unknown but also allows it to distinguish between "<unknown>.bank.com" and "<unknown>.phisher.com". The CNN can distinguish these even though both are unknown and both are derived from ".com", because the data in Slot 2 will have different aggregates for ".bank.com" and ".phisher.com". As a result the CNN will have different label examples and can provide different predictions for the two templates.

Some embodiments use or provide a format or other mechanism for including non-aggregate data to a CNN, e.g., with textual one hot encoding, on a separate branch from the aggregate data.

Some embodiments use or provide a format or other mechanism for presenting rollup data aggregate to a CNN along with the raw data, e.g., with additional planes of 7×10×10 grid (7 days, 10 weeks, 10 kinds of data) for each of the rollups, data may have multiples of these to include rollup counts as features.

Some embodiments use or provide a format or other mechanism for including non-aggregate rollup data to a CNN, e.g., with additional textual one-hot encoding for all rollups, on separate branches. Each branch may be considered a distinct group of data on which the same prediction is based. A given label may be trained against different branches.

Some embodiments use or provide a format or other mechanism for presenting unknown domain data to a CNN, e.g., by joining to the aggregates but zeroing out an initial 7×10×10 grid to indicate to the CNN that rollup occurred.

Some embodiments use or provide a mechanism for joining labels from other data sources with CNN input formats, e.g., a label join.

Some embodiments use or provide a mechanism for expanding labels along the time domain to expand label count, e.g., label expansion by date.

Some embodiments use or provide a mechanism for incorporating domain information with other features in a machine learning model which combines signals, e.g., training a cascaded model on top of a domain reputation model 402 and including other features in addition to domain reputation features.

One of skill informed by the teachings herein will acknowledge that different notations may be used to convey those teachings. In particular, the <unknown> designation means 'unknown' or 'unseen'. It is not an ordinary wildcard that means all possible values. For instance, unless stated otherwise <unknown> does not involve all theoretically possible rollups; it only involves rollups that the system doesn't have an entry for at the point in time when rollups are sought. Alternate notations could also be used, e.g., instead of "<unknown>" one could write "?" or "*" or "[ . . . ]". But "?" and "*" also have other meanings, in regular expressions, and ellipsis in square brackets has been used to indicate missing paragraphs. So to help prevent confusion those notations are not used here.

As further illustration of rollups, templates 608, and the <unknown> placeholder 604, assumes a reputation table 408 has the entries below, and consider an example of a lookup sequence using the table:

| EntryID | Template | Reputation |
| --- | --- | --- |
| 0 | <unknown>.ms.com | 0.9 |
| 1 | <unknown>.bar.com | 0.6 |
| 2 | <unknown>.com | 0.35 |
| 3 | <unknown> | 0.27 |
| 4 | bar.com | 0.52 |

A reputation assessment lookup sequence using the table could proceed hierarchically as follows. A tool obtains an internet protocol resource identification (IPRID): "www2.foo.bar.com". The tool performs a first lookup using a query "www2.foo.bar.com"—this lookup fails. The tool broadens the query from "www2.foo.bar.com" to "<unknown>.foo.bar.com", and performs a second lookup using the query "<unknown>.foo.bar.com"—this lookup also fails. The tool broadens the query from "<unknown>.foo.bar.com" to "<unknown>.bar.com", and performs a third lookup using the query "<unknown>.bar.com"—this lookup succeeds. The matching entry (id 1) has the template "<unknown>.bar.com" and the reputation 0.6. The tool returns a tuple {"<unknown>.bar.com", 0.6} as the reputation assessment result. The result 0.6 is then employed 1318 to enhance security with respect to the initial IPRID "www2.foo.bar.com".

More generally, an <unknown> designation 604 may occur in a domain name, e.g., "<unknown>.bar.com". The <unknown> designation 604 may also occur in a path 610, e.g., "www2.foo.bar.com/<unknown>/phishingpageX". The <unknown> designation 604 may also occur in a query component 612, e.g., "www.foo.bar.com/path?user=<unknown>".

The <unknown> designation may also occur in an IP address 616, e.g., "1.2.<unknown>". In this IP address example "1.2.<unknown>", the "<unknown>" portion matches two of the four octets 618 of an IPv4 address, and "1.2.<unknown>" as a whole matches multiple IPv4 addresses (the ones that start with 1.2). A rollup hierarchy for IPv4 addresses may be represented as follows:
1.2.3.4
1.2.3.<unknown>
1.2.<unknown>
1.<unknown>

In some embodiments, a machine learning model 402 can serve as the lookup table 408, or produce 1314 the lookup table, or both can be true. The table can be generated by a trained machine learned model, usually meaning the features are unavailable at inference time. Or the trained model can itself be the table, meaning the features are all available as used at inference time.

In some embodiments, the convolutional neural network is trained on raw statistics and aggregates, allowing it to build up features. Laying out the different aggregates into different planes of the input allows a trainer or tester or other developer to easily add new planes and rebuild the model. The features are based on aggregated data about the domain. These aggregates include data from logs such as number of times detonated, assigned verdicts, and return codes from the detonation. Other information can supplement this such as whois data about the domain. Included in the aggregates are aggregates from all of the subdomains, so the aggregates for the domain www2.foo.bar.com would include the aggregates for foo.bar.com, bar.com and .com for each day. The different types of information are gathered in different aggregates. Some of these are based on detonation results, or the output of an ML model on the detonation results. Others could be from other sources, like whois. In some embodiments, the aggregates include: number of submissions, number of successful detonations, number of failed detonations, number of malicious verdicts, and number of good verdicts.

In some embodiments, there is no need for example for developers to manually create any combination feature, like a feature combining #SiteUnavailable and #TotalDetonations. Those connections are made instead within the CNN. That is, the model itself is not necessarily free of combination features since it is allowed to generate its own set of combination features internally in one of its layers. But in these embodiments the model is not given any combination features selected by humans. The training data for the model is free of combination features. The training process for the model effectively learns the useful combinations. This provides the technical benefit of the combinations without requiring manually figuring out the important combinations.

In some embodiments, aggregates 308 are aggregated by date, domain, yielding a large list of [date, domain, [aggregates]] (or in another notation: {date, domain, aggregate(s)}). To make this work as desired with rollups the embodiment then perform rollups on these, on all of the domains and joins together, by performing summations on the individual counts, so 'number of submissions' is now the summation of 'number of submissions' for all of the domains that share a subdomain. At this point, the training data looks like this: [date, domain/subdomains, [aggregates]].

Then the embodiment takes each domain and grabs, e.g., the previous ten weeks (70 dates) of aggregates for that domain or subdomain. When it does not find any aggregates it fills in zeros. So now the data looks like this: [date, domain/subdomains, [[aggregates_0], [aggregates_1], . . . ] where the _# corresponds to how many days it was previous to 'date'.

The aggregates blocks are then slightly reorganized to place common types together onto a table, e.g.,
Submission Counts:
_0, _1, _2, _3, _4, _5, _6
_7, _8, . . .

This approach helps ensure several things. The most recent date is always _0 in the upper left, so the CNN can prioritize recent data over older data. Previous weeks are aligned by columns, since much of data goes in weekly cycles. All aggregates are arranged in the same manner so 'number of successful detonations' for instance is also arranged the same way and shows up as an additional plane. Since all data within a given plane is the same kind of data (data type) (same semantic same meaning), the CNN can relate together several things that happen on the same day. New planes can easily be added and the CNN will figure out how to use it for connections or correlations internally to the CNN.

In some embodiments, the labels are the same labels used for another trained system, with any previous features stripped off. The label item itself includes the tuple {domain, date, label} plus some debug information for humans, such as a reference to a source of data, e.g., "detonation log", "whois", "network proxy log", etc.

Some embodiments perform or rely on expansion 1414 of labels by using the same label to aggregates from data several days ahead, along with a corresponding join which resolves cases when the domain is new. In some, a label/aggregates join facilitates correctly training the Convolutional Neural Network, which returns the correct score for rollup domains. One of skill informed by the teachings herein will acknowledge that the labels can be borrowed from different data sets (e.g., screenshots, whois), where a human was possibly looking at different data to make a decision (e.g., the human may have seen screenshots and trademark features).

Some systems 212 do not rely on the data the human used to label the example. Instead, some systems 212 rely on the label itself, and the domain and date information, as specified by the tuple {domain, date, LABEL}. Specifying the date restricts some systems to aggregates which are older than that day. Then a rollup algorithm as described herein is performed to find the correct aggregate which represent desired features.

So if the label tuple is {'10/29/2017', foo.bar.com, PHISH} then 10/29/2017 is the date, foo.bar.com is the domain, and PHISH is the label. In general a label could be a Boolean verdict or an enumeration value or numeric. This example embodiment looks on 10/28/2017 and before to see if it has aggregates for that domain. If it does not, then it uses the same date and continuing rollups until it either lands on a rollup that matches or it runs out of rollups. Either way it specifies to the ML model 402 that it performed a rollup, and uses those features to train the CNN 404 or other model 402. In other words, using the date from a human label which may be already available, this embodiment discovers the raw aggregate data which predates the label and relates to the label according to the rollup algorithm and the domain information from the labeled example. These aggregate features are in turn used to train the CNN to predict the label.

Some embodiments join features to labels using the date and the domain information on the label and find aggregates matching those values, subtracting one day, if the data is not available in the join. They perform a rollup on the aggregates and use the label on the rolled up version to score the <unknown>.TLD type aggregates.

Some embodiments then take a large set of aggregate data for that domain, and format it into a 3-dimensional table 320 which creates a cell for a single days' worth of data, and puts the different data types as planes on top of the data. This is loosely analogous to formatting data for a picture where each pixel has an X,Y location and the different colors are different planes of data. This grid is fed, with a label, into a Convolutional Neural Network which creates a model that will try to predict the label.

In some embodiments, there are two kinds of rollup. One is rolling up aggregates to ML as additional features (context), which helps by grouping domains that share rollups. Another is lookup using rollup.

In some embodiments, data flow is [domain, date, label] to a join with aggregates, yielding [domain, date, label, agg] to be fed to a neural network as [label, agg] where agg is an aggregate feature yielding a predicted label.

Some embodiments produce a list of domain fragments using a machine learned system. The labels are the same labels use for another trained system, but any previous features have been stripped off and the label itself consists of the tuple {domain, date, Label} plus some debug information. The features are based on aggregated data about the domain. These aggregates include data from logs such as number of times detonated, the detonation verdict, and return codes from the detonation. Other information can supplement this such as 'whois' data about the domain, geolocation, [origination IP, destination IP]. Included in the aggregates are aggregates from all of the subdomains, so the aggregates for the domain www2.foo.bar.com would include the aggregates for foo.bar.com, bar.com and .com for each day. A large set of aggregate data for that domain format is put into a grid with a cell for each single days' worth of data, with different kinds of data as planes. This data grid is fed into a CNN that will try to predict the label. Aggregates for the from past days prior to receipt of the detonation label help make the CNN predictive of how the malicious the domain will be the next day. Label expansion can further improve model predictivity by also applying that label on aggregates from that domain, several more days ahead. Once the model is built (trained) against labeled examples, that model is applied on some or all of the most recent aggregates. Those results create the table 408 with scores, which can be shipped to be used in a real-time system.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings herein provide a variety of IPRID 202 reputation assessment 212 functionalities which enhance 1320 cybersecurity 1322. IPRIDs 202 include IP addresses 616, domain names 348, and other network 108 resource identities. A convolutional neural network 404 or other machine learning model 402 is trained 1308 with data 304 including aggregate features 308 or rollup features 310 or both. Aggregate features 308 may include aggregated data such as submission counts 736, 744, 748, classification counts 758, 764, 770, HTTP code counts 704, 708, 712, 716, 720, 724, 728, 732, detonation statistics 790, 792, and redirect counts 752, for instance, as well as others discussed herein. Rollup features 310 reflect hierarchical rollups 1406 of data 118 using <unknown> value placeholders 604 specified in IPRID templates 608 to designate one or more unknown values 606. The trained model 402 can predictively infer 1312 a label 326, or produce 1314 a rapid lookup table 408 of a corpus 410 of IPRIDs and their maliciousness probabilities 412. Training data 304 may be organized in grids 320 with week rows 324, weekday columns 322, vector space planes 332, branches 340, and slots 1428, 1430, for instance. Training data 304 may include whois data 336, geolocation data 338, and tenant data 334. Training tuple 406 sets may be expanded 1414 by date 318 or by original IPRID 344. Trained models 402 can predict 1438 domain labels 326 accurately while operating 1434 at scale 1436, even when most of the domains 348 encountered have never been classified before.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into domain reputation assessment software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 13 and 14 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An internet protocol resource identification (IPRID) reputation assessment system, comprising:
    a memory;
    a processor in operable communication with the memory, the processor and the memory configured in a trained convolutional neural network which was trained using IPRID reputation training data;
    wherein the IPRID reputation training data includes at least one rollup feature based on a hierarchical rollup of data about IPRIDs which includes at least one placeholder designating an unknown value; and
    wherein the IPRID reputation assessment system is configured to enhance security of a guarded system by performing at least one of the following: the trained convolutional neural network inferring a label which distinguishes a malicious IPRID from other IPRIDs, or the trained convolutional neural network producing a lookup table which distinguishes malicious IPRIDs from other IPRIDs.

2. The system of claim 1, wherein the convolutional neural network is trained using IPRID reputation training data that includes at least three of the following aggregate features:
    a count of distinct submissions;
    a count of distinct final hostnames;
    a count of submissions of a particular IPRID;
    a count of submissions of a particular IPRID from within a document as opposed to from use in a network communication protocol exchange as a uniform resource locator;
    a count of redirects to a particular IPRID;
    a count of classifications of a particular IPRID as non-malicious;
    a count of times a particular IPRID was unreachable due to an endpoint network error;
    a count of classifications of a particular IPRID as a malicious phishing IPRID;
    a count of classifications of a particular IPRID as a malicious IPRID other than a phishing IPRID;
    a count of any network errors encountered when attempting to reach a particular IPRID;
    a count of HTTP code 200 responses encountered when attempting to reach a particular IPRID;
    a count of HTTP code 301 responses encountered when attempting to reach a particular IPRID;
    a count of HTTP code 0 responses encountered when attempting to reach a particular IPRID;
    a count of HTTP code 400 responses encountered when attempting to reach a particular IPRID;
    a count of HTTP code 401 responses encountered when attempting to reach a particular IPRID;
    a count of HTTP code 403 responses encountered when attempting to reach a particular IPRID;
    a count of HTTP code 404 responses encountered when attempting to reach a particular IPRID;
    a count of HTTP code responses other than individually tallied response codes were encountered when attempting to reach a particular IPRID.

3. The system of claim 1, wherein the convolutional neural network is trained using IPRID reputation training data that includes at least two of the following aggregate features:
    a number of submissions;
    a successful detonation statistic;
    a failed detonation statistic;
    a verdict statistic indicating classification as non-malicious; or
    a verdict statistic indicating classification as malicious.

4. The system of claim 1, wherein the convolutional neural network is trained using IPRID reputation training data that includes at least one of the following rollup features:
    a rollup aggregating data for an IPRID template which includes a domain name portion of a uniform resource locator, wherein the domain name portion includes a placeholder designating an unknown value;
    a rollup aggregating data for an IPRID template which includes a path portion of a uniform resource locator, wherein the path portion includes a placeholder designating an unknown value;
    a rollup aggregating data for an IPRID template which includes a query portion of a uniform resource locator, wherein the query portion includes a placeholder designating an unknown value; or
    a rollup aggregating data for an IPRID template which matches multiple IP addresses or multiple IP address octets or both, and includes a placeholder designating an unknown value.

5. The system of claim 1, wherein the convolutional neural network is trained using IPRID reputation training data that is characterized in at least one of the following ways:
    the training data is free of combination features;
    the training data is organized as a grid having weekday columns and week rows;
    the training data is organized in vector space planes that correspond to data sources;
    the training data is organized in vector space planes that correspond to data meanings; or
    the training data is organized in input branches that correspond to groups of data having the same meaning;

the training data includes original domains as opposed to domains reached through redirection; or the training data includes domains reached through redirection.

6. The system of claim 1, comprising an instance of the lookup table which distinguishes malicious IPRIDs from other IPRIDs, the lookup table instance including IPRIDs and corresponding maliciousness probability values for a particular corpus of IPRIDs.

7. An internet protocol resource identification (IPRID) reputation assessment method, comprising:
   obtaining IPRID reputation training data which includes rollup features that are based on hierarchical rollups of data about IPRIDs which include placeholders designating unknown values;
   training a machine learning model using the IPRID reputation training data; and
   utilizing the trained machine learning model by producing a lookup table which distinguishes malicious IPRIDs from other IPRIDs.

8. The method of claim 7, wherein the method is characterized in at least one of the following ways:
   the IPRID reputation training data includes label tuples, with each label tuple having an IPRID, a date, and a label, and obtaining IPRID reputation training data comprises expanding training data by date to include a set of label tuples which all have the same IPRID and the same label but have different dates; or
   the IPRID reputation training data includes label tuples, with each label tuple having an original IPRID, a final IPRID, a date, and a label, and obtaining IPRID reputation training data comprises expanding training data by date or by original IPRID to include a set of label tuples which all have the same final IPRID and the same label but have different dates or different original IPRIDs or both.

9. The method of claim 7, wherein the obtaining comprises joining {domain, date, label} tuples with one or more rollup features.

10. The method of claim 7, wherein obtaining comprises joining {domain, date, label} tuples with one or more aggregate features that are based on aggregated data about respective IPRIDs, and training comprises feeding {domain, date, label, aggregate(s)} tuples to a neural network.

11. The method of claim 7, wherein the producing produces a lookup table including IPRIDs and corresponding maliciousness probability values for more than one hundred thousand IPRIDs.

12. The method of claim 7, wherein the obtaining comprises:
   generating a base slot for a domain;
   generating a rollup slot for the domain;
   assigning to the base slot a value that depends at least in part on whether a reputation score is known for the domain; and
   assigning a rollup value to the rollup slot.

13. The method of claim 7, wherein the machine learning model includes a convolutional neural network, and wherein training comprises feeding the convolutional neural network a grid which has separate planes for respective aggregate features.

14. The method of claim 7, wherein the machine learning model includes a convolutional neural network, and wherein training comprises feeding the convolutional neural network a grid of label tuples which contain feature values that are calculated, from feature data, relative to a receipt date of the feature data.

15. The method of claim 7, wherein producing a lookup table comprises inferring a label for a current date based on aggregate feature data for prior dates.

16. A computer-readable storage medium configured with data and instructions which upon execution perform an internet protocol resource identification (IPRID) reputation assessment method, the method comprising:
   obtaining IPRID reputation training data which includes at least rollup features that are based on hierarchical rollups of data about IPRIDs which include placeholders designating unknown values;
   training a machine learning model using the IPRID reputation training data; and
   utilizing the trained machine learning model by inferring a maliciousness probability for at least one IPRID.

17. The storage medium of claim 16, wherein:
   training uses IPRID reputation training data that includes both aggregate features and rollup features; and
   utilizing the trained machine learning model comprises inferring respective maliciousness probabilities for at least one hundred thousand IPRIDs and also comprises producing a lookup table which includes the IPRIDS and the respective maliciousness probabilities.

18. The storage medium of claim 16, wherein training uses IPRID reputation training data that includes at least two of the following:
   a feature based on counts of classifications of a domain;
   a feature based on whois data;
   a feature based on geolocation data; or
   a feature based on tenant data.

19. The storage medium of claim 16, wherein training uses IPRID reputation training data that includes at least two of the following:
   a feature based on raw aggregate data;
   a feature based on non-aggregate data;
   a feature based on aggregate rollup data; or
   a feature based on non-aggregate rollup data.

20. The storage medium of claim 16, wherein utilizing the trained machine learning model comprises utilizing at least one of the following:
   a convolutional neural network;
   a decision tree classifier;
   a long short term memory model;
   a logistical regression model; or
   a deep neural network.

* * * * *